United States Patent
Kintzer et al.

(10) Patent No.: US 6,968,328 B1
(45) Date of Patent: Nov. 22, 2005

(54) METHOD AND SYSTEM FOR IMPLEMENTING RULES AND RULEFLOWS

(75) Inventors: Eric Kintzer, Menlo Park, CA (US); Carlos A. Serrano-Morales, Sunnvale, CA (US)

(73) Assignee: Fair Isaac Corporation, San Diego, CA (US)

( * ) Notice: Subject to any disclaimer, the term of this patent is extended or adjusted under 35 U.S.C. 154(b) by 930 days.

(21) Appl. No.: 09/751,535

(22) Filed: Dec. 29, 2000

(51) Int. Cl.[7] .............................. G06N 5/00

(52) U.S. Cl. ........................ 706/45; 706/61

(58) Field of Search ............... 706/45, 50, 61; 707/102; 434/118

(56) References Cited

U.S. PATENT DOCUMENTS

| | | | | |
|---|---|---|---|---|
| 5,712,960 A | * | 1/1998 | Chiopris et al. | 706/61 |
| 5,995,955 A | * | 11/1999 | Oatman et al. | 705/50 |
| 6,171,109 B1 | * | 1/2001 | Ohsuga | 434/118 |
| 6,604,108 B1 | * | 8/2003 | Nitahara | 707/102 |

* cited by examiner

*Primary Examiner*—Wilbert L. Starks, Jr.
(74) *Attorney, Agent, or Firm*—Glenn Patent Group; Michael A. Glenn

(57) ABSTRACT

The present invention is directed to a method and mechanism for using rules metaphors to implement rules and ruleflows. Examples of such rules metaphors include decision tables, trees, scoreboards, state transition diagrams, and questionaires. By providing a choice of different rules metaphors, a rule developer can advantageously tailor the framework by which rules are created and accessed to more closely match the specific processes or task being addressed.

78 Claims, 23 Drawing Sheets

SHIPPING PROCESS *101*

RULE FLOW *108*

FIG. 2a

| PACKAGE WEIGHT | DESTINATION | |
|---|---|---|
| | DOMESTIC | FOREIGN |
| <1 LB. | $5 | $25 |
| 1 - 5 LB. | $10 | $35 |
| >5 LB. | $20 | $45 |

| | DESTINATION CELL | DESTINATION CELL |
|---|---|---|
| WEIGHT CELL | PRICE CELL | PRICE CELL |
| WEIGHT CELL | PRICE CELL | PRICE CELL |
| WEIGHT CELL | PRICE CELL | PRICE CELL |

250, 252, 254

| CONDITIONS | | | | | |
|---|---|---|---|---|---|
| SALARY | HIGH | HIGH | LOW | HIGH | LOW |
| WORK QUANTITY | HIGH | LOW | LOW | LOW | HIGH |
| WORK QUALITY | HIGH | HIGH | LOW | LOW | LOW |
| PUNCTUALITY | LATE | ON-TIME | EARLY | LATE | |
| ACTIONS | | | | | |
| EMPLOYEE 1 | KEEP | KEEP | FIRE | FIRE | KEEP |
| EMPLOYEE 2 | KEEP | FIRE | KEEP | FIRE | KEEP |
| EMPLOYEE 3 | KEEP | KEEP | KEEP | FIRE | FIRE |

| | | OR | | |
|---|---|---|---|---|
| CREDIT APPLICANTS = "MALE" | | T | | |
| CREDIT APPLICANTS = "EMPLOYED" | F | | T | T |
| APPLICANT_SALARY> = MINIMUM SALARY | | | F | |
| CREDIT CARD_STATUS = "TRUE" | | F | | T |
| APPLICANT_HOUSING = "RENTER" | | T | | |

AND

CREDIT_APPLICANT.GENERATE_REJECTION_LETTER

FIG. 2g

| TOTAL ASSET SIZE | $250K LOL | $500K LOL | $1M LOL | $2M LOL | $3M LOL | $5M LOL | >$5M LOL |
|---|---|---|---|---|---|---|---|
| $10M-$25M | .75 * $1M LOL | .80 * $1M LOL | $21K | 1.65 * $1M LOL | 2.40 * $1M LOL | 2.80 * $1M LOL | REINSURANCE RATE CALC |
| $25M-$50M | .75 * $1M LOL | .80 * $1M LOL | $25K | 1.65 * $1M LOL | 2.40 * $1M LOL | 2.80 * $1M LOL | REINSURANCE RATE CALC |
| $50M-$100M | .75 * $1M LOL | .80 * $1M LOL | $29K | 1.65 * $1M LOL | 2.40 * $1M LOL | 2.80 * $1M LOL | REINSURANCE RATE CALC |
| $100M-$150M | .75 * $1M LOL | .80 * $1M LOL | $37K | 1.65 * $1M LOL | 2.40 * $1M LOL | 2.80 * $1M LOL | REINSURANCE RATE CALC |
| $150M-$250M | .75 * $1M LOL | .80 * $1M LOL | $44K | 1.65 * $1M LOL | 2.40 * $1M LOL | 2.80 * $1M LOL | REINSURANCE RATE CALC |
| >$250M | .75 * $1M LOL | .80 * $1M LOL | $65K | 1.65 * $1M LOL | 2.40 * $1M LOL | 2.80 * $1M LOL | REINSURANCE RATE CALC |

FIG. 2h

| CUSTOMER VALUE | SIZE OF BILL | PAYMENT PATTERN | STRATEGY ASSIGNED |
|---|---|---|---|
| HIGH | BELOW AVERAGE | LACKADAISICAL REASONABLE STELLAR | LENIENT LENIENT NO ACTION |
| | SIMILAR TO AVERAGE | LACKADAISICAL REASONABLE STELLAR | MODERATE LENIENT LENIENT |
| | ABOVE AVERAGE | LACKADAISICAL REASONABLE STELLAR | MODERATE MODERATE LENIENT |
| MEDIUM | BELOW AVERAGE | LACKADAISICAL REASONABLE STELLAR | MODERATE LENIENT NO ACTION |
| | SIMILAR TO AVERAGE | LACKADAISICAL REASONABLE STELLAR | MODERATE LENIENT LENIENT |
| | ABOVE AVERAGE | LACKADAISICAL REASONABLE STELLAR | AGGRESSIVE MODERATE LENIENT |
| LOW | BELOW AVERAGE | LACKADAISICAL REASONABLE STELLAR | AGGRESSIVE MODERATE LENIENT |
| | SIMILAR TO AVERAGE | LACKADAISICAL REASONABLE STELLAR | OCA AGGRESSIVE MODERATE |
| | ABOVE AVERAGE | LACKADAISICAL REASONABLE STELLAR | OCA AGGRESSIVE AGGRESSIVE |

FIG. 2i

| | | PAYMENT PATTERN | | |
|---|---|---|---|---|
| CUSTOMER VALUE | SIZE OF BILL | LACKADAISICAL | REASONABLE | STELLAR |
| HIGH | BELOW AVERAGE<br>SIMILAR TO AVERAGE<br>ABOVE AVERAGE | LENIENT<br>MODERATE<br>MODERATE | LENIENT<br>LENIENT<br>MODERATE | NO ACTION<br>LENIENT<br>LENIENT |
| MEDIUM | BELOW AVERAGE<br>SIMILAR TO AVERAGE<br>ABOVE AVERAGE | MODERATE<br>MODERATE<br>AGGRESSIVE | LENIENT<br>LENIENT<br>MODERATE | NO ACTION<br>LENIENT<br>LENIENT |
| LOW | BELOW AVERAGE<br>SIMILAR TO AVERAGE<br>ABOVE AVERAGE | AGGRESSIVE<br>OCA<br>OCA | MODERATE<br>AGGRESSIVE<br>AGGRESSIVE | LENIENT<br>MODERATE<br>AGGRESSIVE |

FIG. 2j

| CUSTOMER VALUE | SIZE OF BILL | LACKADAISICAL | REASONABLE | STELLAR |
|---|---|---|---|---|
| HIGH | BELOW AVERAGE<br>SIMILAR TO AVERAGE<br>ABOVE AVERAGE | LENIENT<br>MODERATE<br>MODERATE | LENIENT<br>LENIENT<br>MODERATE | NO ACTION<br>LENIENT<br>LENIENT |
| MEDIUM | BELOW AVERAGE<br>SIMILAR TO AVERAGE<br>ABOVE AVERAGE | MODERATE<br>MODERATE<br>AGGRESSIVE | LENIENT<br>LENIENT<br>MODERATE | NO ACTION<br>LENIENT<br>LENIENT |
| LOW | BELOW AVERAGE<br>SIMILAR TO AVERAGE<br>ABOVE AVERAGE | AGGRESSIVE<br>OCA<br>OCA | MODERATE<br>AGGRESSIVE<br>AGGRESSIVE | LENIENT<br>MODERATE<br>AGGRESSIVE |

| NUMBER OF TIMES LATE | TOTAL NUMBER OF DAYS LATE | PAYMENT PATTERN |
|---|---|---|
| 0 | | STELLAR |
| 1 | <= 20 | STELLAR |
| | <= 40 | REASONABLE |
| | > 40 | LACKADAISICAL |
| 2 | <= 30 | REASONABLE |
| | > 30 | LACKADAISICAL |
| 3+ | | LACKADAISICAL |

FIG. 2k

| AGE OF APPLICANT | UNDER 18 -100 PTS. | 18 - 25 0 PTS. | 26 - 31 20 PTS. | 32 - 40 50 PTS. | 41 AND OVER 20 PTS. |
|---|---|---|---|---|---|
| YEARS ON JOB | LESS THAN 1 YEAR 5 PTS. | 1 - 2 YEARS 20 PTS. | OVER 2 YEARS 50 PTS. | | |
| MAJOR CREDIT CARD | YES 30 PTS. | NO 2 PTS. | | | |
| OWN OR RENT | OWN OR BUYING 70 PTS. | RENT 20 PTS. | LIVE WITH PARENTS -20 PTS. | OTHER 10 PTS. | |
| SALARY | UNDER 10K/YEAR 5 PTS. | 10K - 50K PER YEAR 20 PTS. | OVER 50K PER YEAR 50 PTS. | | |

| CREDIT SCORE | CREDIT DECISION |
| --- | --- |
| <100 | NO |
| 100 - 150 | YES IF APPLICANT IS HOMEOWNER |
| > 150 | YES |

| STIMULUS \ STATE | GET ORDER | CHECK CREDIT | ASK FOR PAYMENT | ATTEMPT TO DELIVER | NEW STATE |
|---|---|---|---|---|---|
| WAITING FOR ORDERS | ENTER ORDER | — | — | — | ORDER ENTERED |
| ORDER ENTERED | — | IF CREDIT, OK, THEN GET PAYMENT ELSE REJECT ORDER | — | — | CREDIT CHECKED |
| ORDER REJECTED | — | — | — | — | WAITING FOR ORDERS |
| CREDIT CHECKED | — | — | CHECK FOR PAYMENT | — | PAID |
| PAID | — | — | — | SEND TO DELIVERY SPECIALIST | DELIVERED |
| DELIVERED | — | — | — | — | WAITING FOR ORDERS |

METHOD AND SYSTEM FOR IMPLEMENTING RULES AND RULEFLOWS

BACKGROUND OF THE INVENTION

The present invention relates generally to knowledge based systems. Knowledge based systems, which are sometimes referred to as expert systems, utilize a knowledge base of information to perform or facilitate an application/business process. Essentially, the goal of a knowledge based system is to mimic the thought process that an expert in a particular field would utilize to address tasks in that field. Knowledge based systems can be employed in a wide variety of settings. For example, bank loan officers use such systems for guidance in approving and rejecting loan applications. The military may use knowledge based systems to analyze battlefield conditions and make tactical suggestions. Other examples of disciplines in which knowledge based systems can be used include automobile repair, medical diagnosis, oil exploration, financial planning, chemical analysis, surgery, locomotive repair, weather prediction, computer repair, computer system configuration, operation of nuclear plants, interpreting government regulations, tax preparation, as well as many others.

To implement a knowledge based system, the first action is often to map out the activities of the application or business workflow/process being addressed. Any of the process activities that are receptive to computerized automation or assistance can thereafter be implemented in a knowledge based system. In general, this is accomplished by obtaining information regarding how those knowledgeable in that field would accomplish the particular process activity being addressed, and decompiling that information to create a knowledge base. This information typically includes logical thought processes that are utilized to perform tasks, decision points that may be encountered, and information necessary to resolve these decision points to select proper courses of action.

Several approaches can be utilized to implement process activities in a knowledge based system. One such approach is the "code-based" approach. The code-based approach involves computerized automation of a business process by creating application-specific software code using a programming language such as C or Java. Unfortunately, this approach is limiting in its extensibility and adaptability since changes to the business/application process activity could require significant changes to the original software code, which may be prone to the introduction to new errors into the code, inefficient because the software code must be changed and recompiled, and difficult in certain situations—especially if the original programmers or adequate documentation are no longer available.

An alternate approach is the "rules-based" approach, which is performed by configuring a set of rules directed to the application/business process activity and applying the ruleset using a rules engine. The set of steps of the application/business process activity could be represented as a "ruleflow," and each ruleflow can be represented as a series of ruleflow elements such as tasks, events, subprocesses, loops, and branches. Under this approach, additions, extensions, and modifications to the business process activity can be implemented by changing rule entries in the corresponding ruleset(s) rather than recoding and recompiling application specific software code. An exemplary rules-based product embodying this approach is the Blaze Advisor™ product available from Blaze Software, Inc. of San Jose, Calif. The present invention is directed to an improved method and system for implementing rules and ruleflows.

SUMMARY OF THE INVENTION

The present invention is directed to a method and mechanism for using rules metaphors to implement rules and ruleflows. Examples of such rules metaphors include decision tables, trees, scoreboards, state transition diagrams, and questionaires. By providing a choice of different rules metaphors, a rule developer can advantageously tailor the framework by which rules are created and accessed to more closely match the specific processes or task being addressed.

An aspect of an embodiment is the use of multiple rule metaphors for different tasks or rulesets even within the same ruleflow. Another aspect of an embodiment is directed to a first ruleset supported by a rule metaphor drawing upon the results of another ruleset supported by a different rules metaphors.

Further, details of aspects, objects, and advantages of the invention are described in the description, drawings, and claims.

BRIEF DESCRIPTION OF THE DRAWINGS

The invention, together with further advantages thereof, may best be understood by reference to the following description taken in conjunction with the accompanying drawings in which:

FIG. 2a illustrates a decision table rules metaphor according to an embodiment of the invention.

FIG. 2c illustrates the organization of cells in the decision table of FIG. 2a.

FIG. 2f illustrates a partially inverted AND decision table according to an embodiment of the invention.

FIG. 2g illustrates an AND/OR decision table according to an embodiment of the invention.

FIG. 2h illustrates an alternate type of decision table according to an embodiment of the invention.

FIG. 2i illustrates a one-dimensional multi-column decision table according to an embodiment of the invention.

FIG. 2j illustrates a two-dimensional multi-column decision table according to an embodiment of the invention.

FIG. 2k illustrates a first decision table accessing another table.

FIG. 3b depicts a scorecard rules metaphor according to an embodiment of the invention.

FIG. 3c illustrates a decision table usable in conjunction with the scorecard rules metaphor of FIG. 3b.

DETAILED DESCRIPTION OF THE INVENTION

Overview

The present invention is directed to a method and mechanism for using rules metaphors to implement rules and ruleflows. According to an embodiment of the invention, a rules metaphor provides a visual environment for acquiring, generating, and manipulating rules. Some benefits of utilizing rules metaphors include: 1) allowing an architect/designer to capture rules using interfaces that are closer to the way a business analyst or user generates rules, 2) allowing the rules developer to implement rules using metaphors that are closer to the way the requirements and specifications are expressed, and 3) providing more concise and visually understandable representations of rules.

Each task element in a ruleflow can be associated with a ruleset composed of one or more rules for processing that task. A ruleset can be associated with a specific type of rule metaphor editor. A plurality of different rules metaphor types are available to a rules developer pursuant to an embodiment of the invention, with each rules metaphor editor having differentiating characteristics that makes it more well-suited for certain types of tasks. Examples of such rules metaphors include decision tables, trees, scorecards, state transition diagrams, and questionnaires, which are described in more detail below. By providing a choice of different rules metaphors, the rules developer can advantageously tailor the framework by which rules are created and accessed to more closely match the specific business process being addressed.

According to the invention, multiple rules metaphors could be employed within a single ruleflow. Thus, different tasks within the same ruleflow may be associated with different rule metaphor editors. In addition, a first ruleset supported by a first rules metaphor can draw upon the results of a second ruleset supported by an entirely different rules metaphor. The second ruleset having a different rule metaphor does not necessarily have to be associated with the same ruleflow as the task for the first ruleset.

Illustrated Example Using Decision Tables

Figure 1:
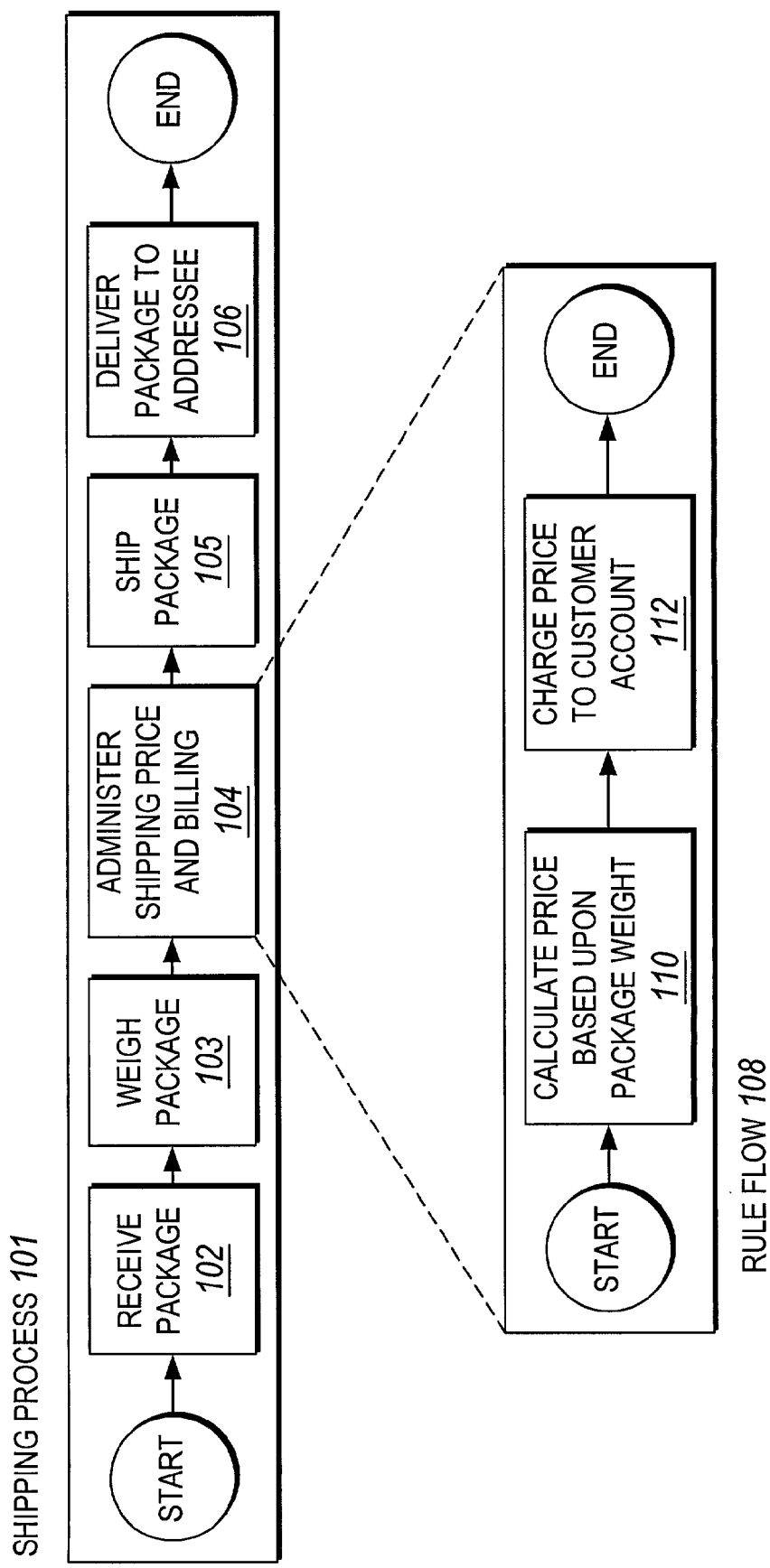
FIG. 1 depicts a business process/workflow, its set of activities, and the corresponding ruleflow for one of those activities.

To illustrate the present invention, consider the business process 101 shown in FIG. 1, entitled "Shipping Process", which is an example of a business workflow or process that a shipping company may employ to ship packages. The business process 101 begins at business process activity 102 when the shipping company receives a package that is to be shipped. The shipping company weighs the package at business process activity 103, administers pricing and billing procedures at activity 104, ships the package at activity 105, and delivers the package at activity 106.

Each activity of business process 101 that is receptive to computerized automation or assistance can be implemented in a rules-based system as a ruleflow. For example, business process activity 104 of business process 101 is directed to the act of administering the shipping price and billing arrangement for a package to be shipped. Business process activity 104 can be further represented as a ruleflow, such as ruleflow 108. Ruleflow 108 comprises a first ruleflow step 110 to calculate a shipping price based upon the weight of a package and second ruleflow step 112 to charge the shipping price to a customer account.

Each ruleflow step (defined herein as a "task") can be further represented as a set of one or more rules. Depending upon the complexity of the task, each task may also be broken down into one or more layers of subtasks before representation as a set of rules. Consider if ruleflow step 110 to determine the shipping price of a package is based upon the following pricing parameters:

1. Packages weighing less than 1 lbs. for domestic shipping have a shipping price of $5.
2. Packages weighing between 1–5 lbs. for domestic shipping have a shipping price of $10.
3. Packages weighing greater than 5 lbs. for domestic shipping have a shipping price of $15.
4. Packages weighing less than 1 lbs. for foreign shipment have a shipping price of $25.
5. Packages weighing between 1–5 lbs. for foreign shipment have a shipping price of $35.
6. Packages weighing greater than 5 lbs. for foreign shipment have a shipping price of $45.

In known rules-based products, the set of one or more rules representing such parameters would be manually created by a rules developer knowledgeable about the specific structured rules-language syntax used with the particular rules engine employed by that developer. Typical structured rules-languages are similar to high level programming languages, and the process to create rules using these rules-language syntaxes is similar to the manual process employed by a programmer writing software code. The following is an example of rules pseudocode for a structured rules-language for the pricing parameters set forth above:

```
if (destination equals "domestic") then
    { if (package_weight < 1) then price = 5
      else if(package_weight > 5) then price = 20
      else price = 10 }
else
    { if (package_weight < 1) then price = 25
      else if(package_weight > 5) then price = 45
      else price = 35 } ;
```

One drawback with this approach is that only someone familiar with the exact rules-language syntax used with a given rules-engine has the ability to create a set of usable rules. Another drawback is that since this process is very similar to software programming, often an experienced programmer is needed to create rules under this approach. Furthermore, rules created by this approach are not readily comprehensible by the end-users or the business analysts that originally created parameters for the rules. In addition, inefficiencies may arise under this approach if maintenance or modifications to the rules are later required.

The present invention addresses these issues by utilizing rules metaphors to create, edit, and parameterize rules for a ruleflow task. One example of a rules metaphor suitable to implement the above pricing parameters is a "decision table." A decision table is a viewable structure having rows and columns in which cells of the decision table represent values and/or combinations of values used for decision making. For many types of business process tasks, decision tables allow presentation of rules information in a visual manner that is intuitively easy to use for even non-programmers to use and understand.

FIG. 2a depicts a decision table 200 corresponding to the pricing parameters outlined above. The left-most column (202) of decision table 200 stores information that categorizes shipping packages by package weight (i.e., "<1 lb.", "1–5 lbs.", and ">5 lbs."). Row 204 contains information that categorizes the shipping destination of a package into the "domestic" category or the "foreign" category. Each cell in center grid 206 contains a price value that corresponds to an intersection of a "package weight" row and a "destination" column, thereby corresponding to a specific combination of a package weight and a destination. For most users and business analysts, the decision table structure shown in FIG. 2a is intuitively more usable and understandable, particularly when compared to rules code in a structured rules-language syntax.

Figure 2B:
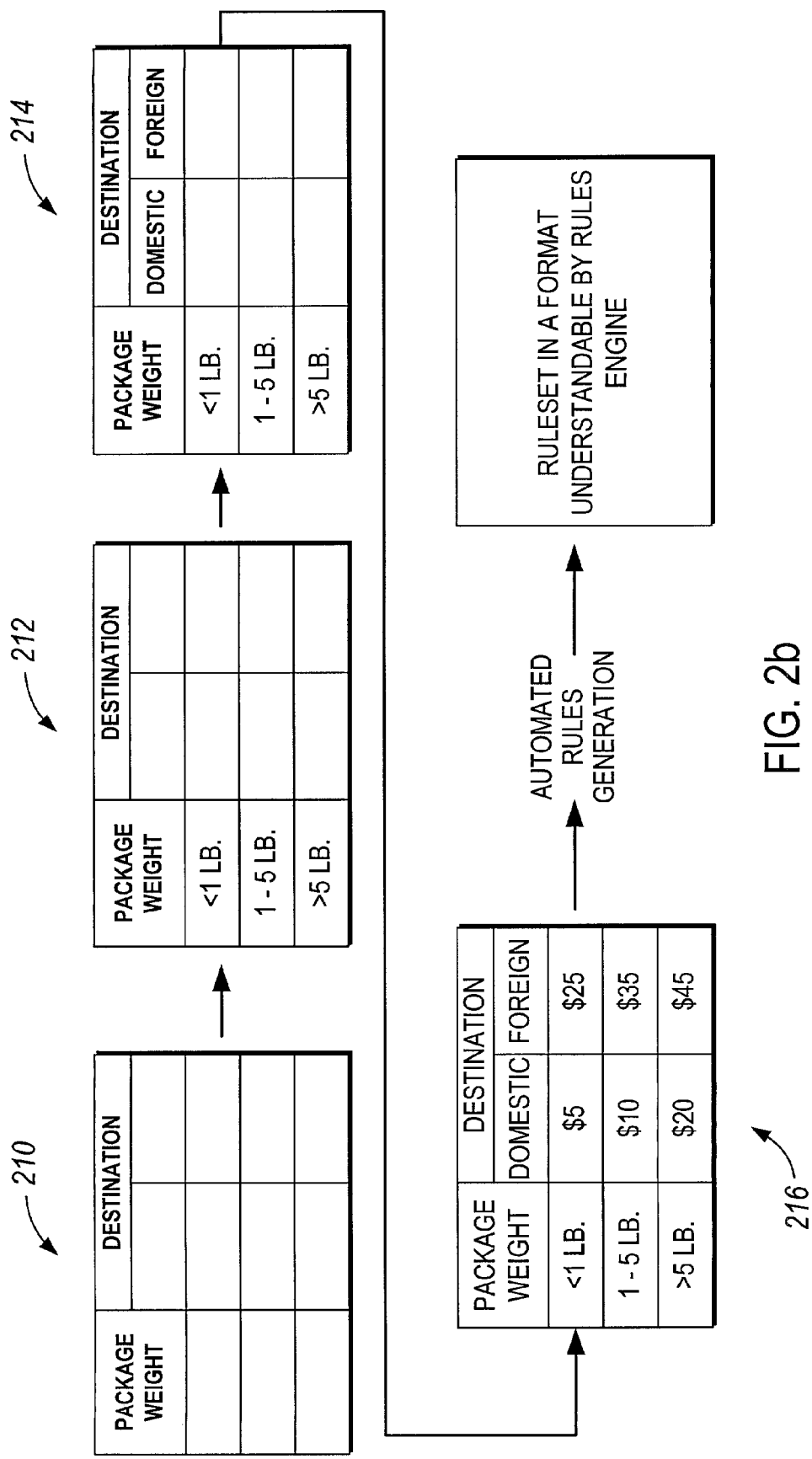
FIG. 2b illustrates a process to populate the decision table rules metaphor of FIG. 2a according to an embodiment of the invention.

FIG. 2b illustrates the overall process to utilize a decision table rules metaphor to create rules associated with the task of calculating shipping price. The first step is to create a blank decision table 210 having the appropriate structure for the business task being addressed. The structure of the blank decision table 210 reflects the type(s) of information needed to perform decision-making tasks as required by the business task. If decision-making is determined based upon specific combinations of information elements/categories, then the decision table is organized to allow formation of unique combinations of such information elements/categories. In the present example, the shipping price of a package is based upon a specific combination of package weight and destination. Thus, the outer column and row of the blank decision table 210 have available cells to store these types of information. The package weight information in this example is inserted into the decision table at the outer-left column to form partially filled decision table 212. Similarly, the destination information for this example is inserted into the decision table at the upper row to form partially filled decision table 214.

The decision table should also be structured such that the juncture of rows/columns for specific combinations of information contain appropriate cells for decision making information relating to such combinations. Here, the shipping price of a package is determined by a unique combination of a package weight and destination; thus, the intersection of each row having package weight information and each column having destination information is a cell to contain shipment price information for that corresponding combination. The completely filled decision table 216 is shown having shipment price information filled in for the appropriate decision table cells.

Note that this process is extremely intuitive since the user can visually determine, at each step, which categories of values are needed. If extensions or modifications to a rule are needed, then the user merely deletes, modifies, or creates additional cells to perform the modification—without the need to reprogram rules in a rule-language syntax. If a new category of information is needed, then the decision table can be expanded to include the new category as a new column or row. Similarly, if the value of any of the cells in the center grid changes, then only those values need to change.

Once the decision table is completely filled-in, the entire decision table structure can be converted into a syntax understandable by a rules engine. In an embodiment, this step converts the decision table into a set of statements in a structured rules-language syntax. In an alternate embodiment, this step converts the decision table information into application specific binary code statements.

According to an embodiment of the invention, conversion of a decision table structure is accomplished by formulating each type or group of cells in the decision table as a separate object type which is defined with attributes appropriate for the kinds of information to be stored in its corresponding cell instances. An example of such an attribute for a cell type includes a "label" attribute to store an identifier for a cell type. Another attribute that may be defined for a cell type is a "translation" attribute to store information relating to the type or syntax of input values that may be placed into a cell. The translation attribute provides configuration information to convert one input type/syntax to another. For example, the translation attribute for the "package weight" object could be defined to accept "1", "1 lb.", or "1 pound" as alternate inputs for the package weight cells to represent one pound. Another attribute that may be defined is the "value" attribute, which stores the value that is assigned to a cell. These examples of cell attributes are merely illustrative, as additional attributes or combinations of attributes may be defined for a cell type within the scope of the invention.

FIG. 2c shows the decision table of FIG. 2a separated into the three distinct cell types utilized in that table. Cell group 250 is a "condition column," containing package_weight cells for storing package weight information used in the decision-making process. Thus, each package_weight cell is an object type having attributes appropriate for storing information about the weight categories for packages to be shipped. Cell group 252 is a "condition row," containing destination cells for storing destination information. Each destination cell is an object type having attributes appropriate for storing information about the destination categories for packages to be shipped. Cell group 254 is formed of the cell type "action type," that represents actions to be taken in the table based upon the values in the conditions row(s) and/or condition column(s).

Rules in a specific rules-language syntax are generated based upon relationships between the various cells in the decision table. According to an embodiment of the invention, a unique rule statement is generated for each action cell in the decision table, with the rule statement having conditional clauses based upon any condition cells associated with that action cell. In operation, a rules engine would comb through the generated ruleset to execute the appropriate rule based upon relevant conditions of the task. The following is an example of pseudocode that is employed to generate rules in a rules-language syntax based upon a decision table having a decision row as a first cell group, a decision column as a second cell group, and a central action grid as a third cell group:

For each action cell, generate an "if" rules statement that performs the specified action for the action cell if the condition in the corresponding decision row and the condition in the corresponding decision column are both true Applying this general statement to the decision table shown in FIG. 2a results in the following example rule statements:

---

If (package_weight is less than 1) and (destination equals "domestic") then shipping_price = 5;
If (package_weight is between 1 and 5) and (destination equals "domestic") then shipping_price = 10;
If (package_weight is greater than 5) and (destination equals "domestic") then shipping_price = 20;

-continued

```
If (package_weight is less than 1) and (destination equals "foreign")
  then shipping_price = 25;
If (package_weight is between 1 and 5) and (destination equals "foreign")
  then shipping_price = 35;
If (package_weight is greater than 5) and (destination equals "foreign")
  then shipping_price = 45;
```

Figure 2D:
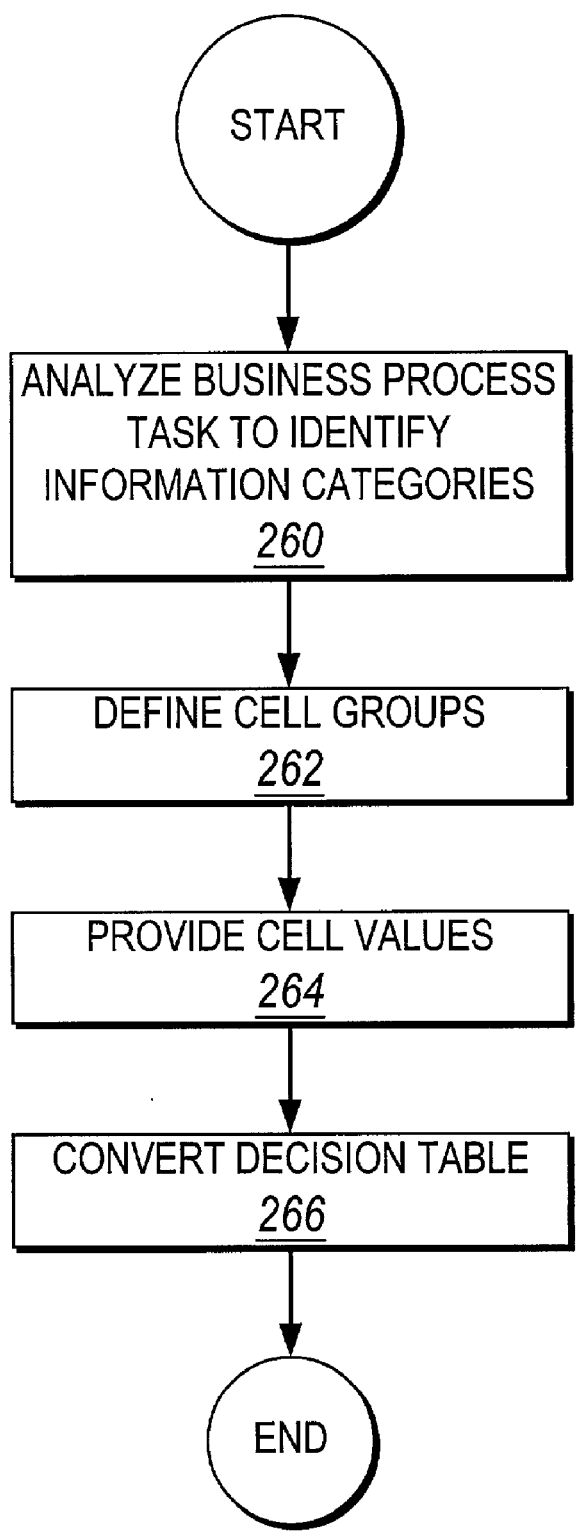
FIG. 2d depicts a process flow for a process to implement a ruleset using a decision table rules metaphor according to an embodiment of the invention.

FIG. 2d is a flowchart of a process for creating and using a decision table rules metaphor according to an embodiment of the invention. At 260, a business process activity's ruleflow task is analyzed to determine the types of information categories needed to perform decision-making for the task. This identification of information directly influences the overall structure of the decision table, particularly with respect to the type, number, and characteristics of condition rows and columns. The specific cell groups utilized in the decision table are thereafter defined, both with respect to their attributes as well as their cell type (e.g., condition row, condition column, or action cell type) (262). The relationship between cells can be further defined at this stage, although default relationships between cell groups can also be employed in an embodiment of the invention. Once these cell groups are defined, the blank decision table is visually presented to the user/rules designer. The cell value for each cell is then provided for the decision table (264). Once the decision table has been completely filled in, the information in the decision table can be converted into a format or syntax more suitable for direct processing by a rules engine (266).

Figure 2E:
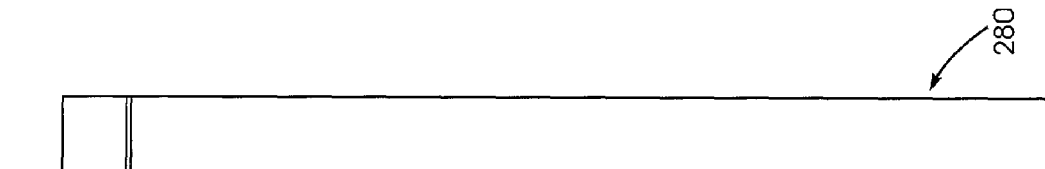
FIG. 2e illustrates an AND decision table according to an embodiment of the invention.

FIGS. 2e–k depict additional examples of decision table types usable in the present invention. Referring to FIG. 2e, shown is a type of decision table 280 referred to herein as the traditional AND decision table. The traditional AND decision tables may be laid out with the following characteristics according to an embodiment of the invention:

All columns, except the last column 282, represent an <object>.<attribute> combination that is involved in the decision making. All contemplated <object>.<attribute> combinations should be represented.

Each row represents a possible combination of values for <object>.<attribute> combinations.

The last column 282 in each row holds the conclusion, decision, or action that results if all <object>.<attributes> that appear in that row occurs as a combination.

FIG. 2f depicts another type of an AND decision table 283, which is partially inverted when compared to the AND decision table of FIG. 2e. Decision table 283 is structured such that rows in the top section 284 representing an <object>.<attribute> combination involved in the decision making process. Each column in top section 284 represents a combination of <object>.<attribute> values. Each cell in the lower section 285 represents the conclusion, decision, or action that results upon the occurrence of the combination of a particular value in the left column 286 of the bottom section 285 values with the set of values for a column from the top section 284. One advantage of this type of AND decision table is that support is provided for indicating that a given <object>.<attribute> is irrelevant for a given decision path.

According to the invention, decision tables can also be structured to allow the expression of complex AND/OR conditions. FIG. 2g illustrates an example of an AND/OR decision table 288. In decision table 288, if all conditions in a condition row match the values in exactly the same truth column, then a specified action can be executed.

FIG. 2h depicts an example of a more complex decision table 289. As shown in column 290 of decision table 289, cells in a decision table according to an embodiment of the invention can include values expressed as formulas. Similarly, cell values can also be expressed as function or subroutine calls, such as the cells in column 291. According to an embodiment, these features of the invention can be implemented by defining appropriate attributes for the particular object types corresponding to the cells having such cell values. Thus, the "action" cell type in FIG. 2h can be defined to include an attribute for "function call", which calls an external function as the action to take if the cell conditions are satisfied. In addition, the "value" attribute for an action cell can be defined to be a formula or equation rather than an absolute value.

FIG. 2i illustrates a one-dimensional multicolumn AND decision table 292. For this type of AND decision table, particular <object>.<attribute> values in a given row position may apply to multiple combinations of values. Similar to AND-type tables already described, the last column 293 contains conclusion values or actions based upon each horizontal combination of <object>.<attribute> values leading to the corresponding value in the last column 293.

Shown in FIG. 2j is an example of a two-dimensional multi-column AND decision table 294. Decision table 294 is functionally equivalent to the one-dimensional decision table 292 shown in FIG. 2i, but provides a more compact structure due to the organization of additional attribute categories 296 along the top portion of results matrix 295.

FIG. 2k illustrates that the present invention can provide a mechanism to invoke a function, ruleset, or another table from within another decision table. A first decision table 297 is shown having a defined section of attributes 298 which is defined by another table 299.

Scorecard Metaphor

Another rules metaphor that can be employed in the invention is the "scorecard". Scorecards are a suitable way to assign points to the values of various attributes for purposes of assessment or classification. A scorecard ruleset would take in one or more objects or object attributes, assign points based upon these objects or attributes, add up the points, and return the result as the ruleset's return value. Scorecards can be visually displayed in a table structure in which individual cells of the scorecard table are associated with attributes possibly applicable to the object under analysis. Each of these cells contains a point value corresponding to that identifiable attribute. The point total for an object is the additive points for all of the applicable cells for that object.

Figure 3A:
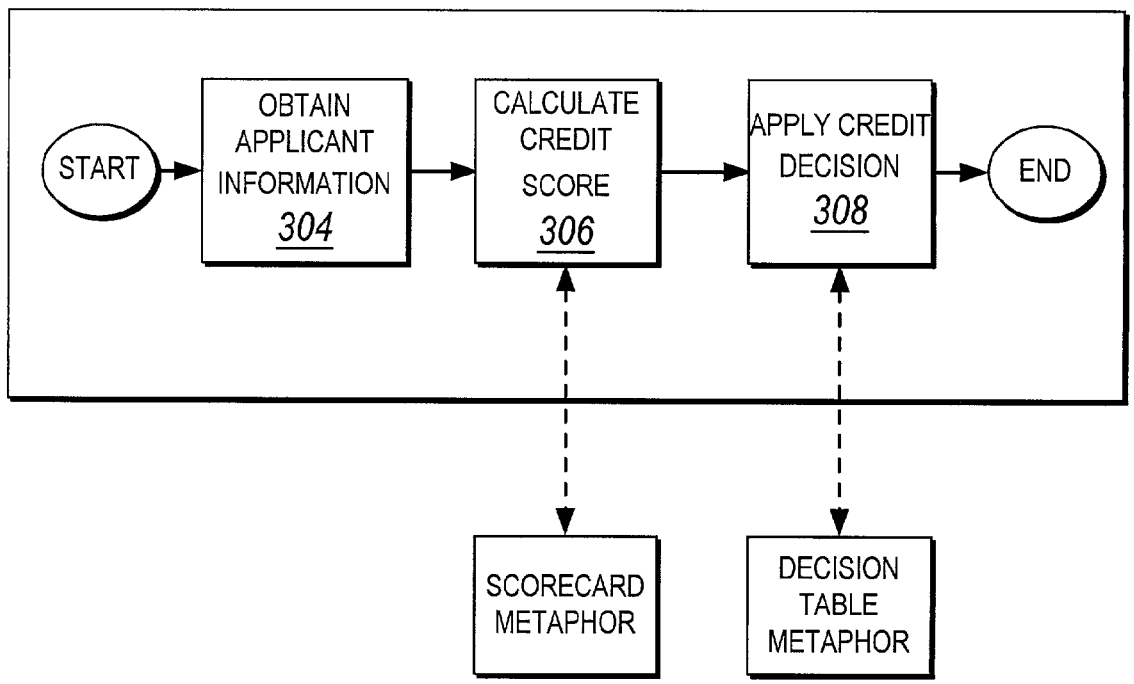
FIG. 3a illustrates an example ruleflow.

FIG. 3a shows an illustrative ruleflow 302 for the business process activity of handling credit applications. At process task 304, application information is obtained for a credit applicant. At process task 306, a credit score is obtained for the application. At process task 308, a credit decision is performed based upon the applicant's credit score. Consider if it is desired to implement task 306 using the scorecard metaphor and task 308 using the decision table metaphor.

FIG. 3b shows an example scorecard 310 that is applicable to process task 306. Various possible attributes of a credit applicant are shown in scorecard 310, such as employment, age, and asset information. This information is categorized and divided into various subset categories. Each subset category is assigned a point total. The specific combination of attributes for a credit applicant is mapped against scorecard 310 to identify all applicable cells, and the points for all applicable cells are totaled to compile the credit applicant's credit score. In this example, higher scores represent lower risk borrower applicants and lower scores represent higher risk borrower applicants.

To illustrate, consider a credit applicant that is 28 years old, has spent 1.5 years on his present job, has a major credit card, owns his own home, and has a salary of $48,000 per year. According to score card 310, his credit score is computed by including 20 points for being in the "26–31" age category, 20 points for years on job in the "1–2 years" category, 30 points for having a major credit card, 70 points for being in the "own or buying a home" category, and 20 points for having a salary in the "10–50 k category per year". Thus, the credit applicant's total score is 160.

FIG. 3c shows a decision table 312 that is applicable to process task 308 of FIG. 3a. The possible ranges of credit scores are categorized to correspond to the types of credit decisions that can be made based upon a credit applicant's credit score. The credit score that results from scorecard 310 for a credit applicant is matched against the categories in the "credit score" column to determine the credit decision that will apply to that applicant. In the present example, the credit applicant has a credit score of "160" which corresponds to a credit decision of "yes".

This example demonstrates an aspect of the invention in which different rules metaphor editors are associated with different tasks/rulesets within the same ruleflow. Since each different rules metaphor has interface characteristics that make it better suited for certain types of tasks, the ability to utilize multiple rules metaphors results in tremendous flexibility to structure the creation and access of rules based upon the exact tasks being addressed in a ruleflow.

This example also demonstrates another aspect of the invention in which a ruleset supported by one rules metaphor is able to draw upon the results of a ruleset supported by an entirely different rules metaphor. As shown by this example, the results of a scorecard metaphor 310 can be returned as an input to other rules, such as a ruleset associated with a decision table 312. Note that a ruleset does not necessarily need to draw from within the same ruleflow for the results of another ruleset. It is expressly within the scope of the invention to employ rules metaphors to generate rulesets or ruleset templates stored in an accessible or centrally referential manner, which are thereafter accessible by other rulesets within other ruleflows.

Tree Metaphor

An alternate rules metaphor to create and represent rules and rulesets is the tree metaphor. Trees can be viewed as a collection of interconnected nodes with each node having a logical or parent-child relationship with another node. In general, trees are characterized by the data that can be stored in each node of the tree and/or the operations that can be applied to the tree. According to an embodiment of the invention, tree structures implement rules and ruleflows in much the same way decision tables are implemented.

One type of tree usable in the invention is a "decision tree," which is a type of tree that describes the decision steps that lead to a given conclusion, decision or action to apply. According to an embodiment, a decision tree has the following types of nodes:

Decision nodes—nodes that have one or more successors out of which an explicit choice is made based upon a situational analysis or based upon evaluation of a condition on the data that is used to make the decision;

Chance nodes—nodes that have one or more successors out of which the decision tree evaluation makes a choice based upon probability factors; and Terminal nodes—contains the conclusion of the decision making process or the action to apply.

Figure 4A:
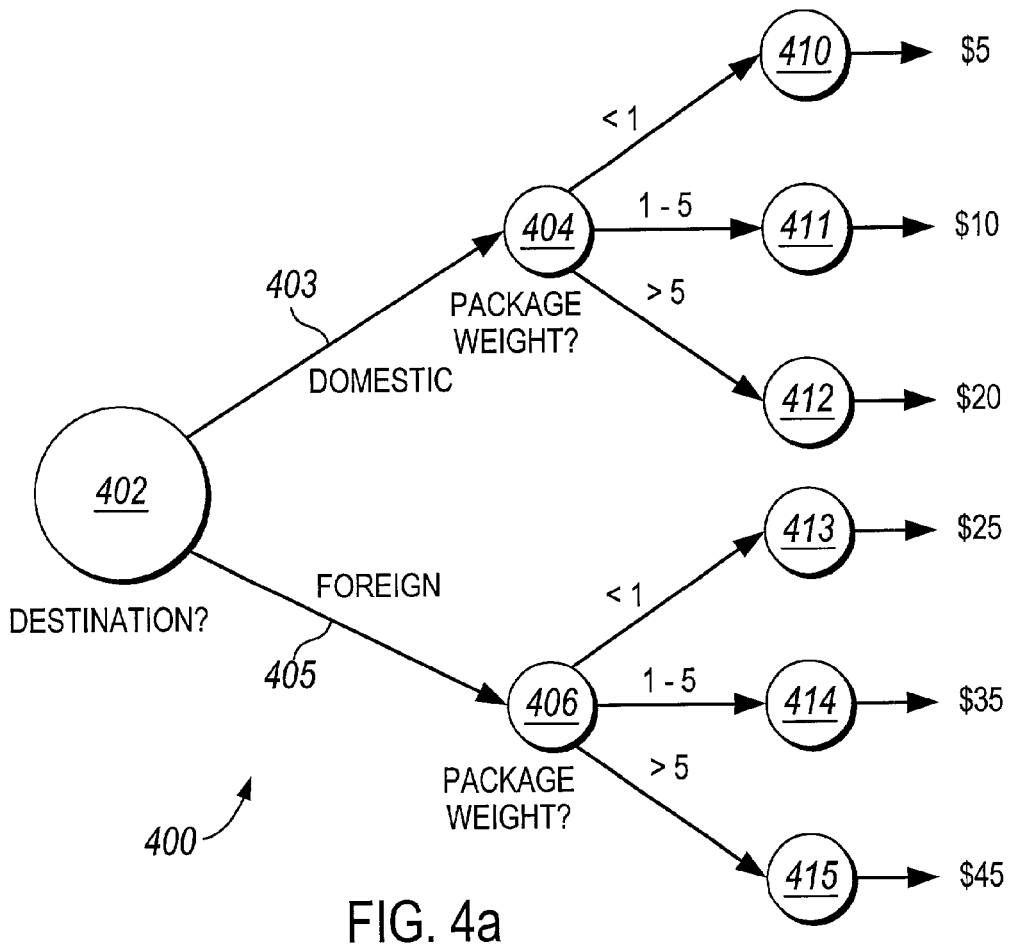
FIG. 4a illustrates a decision tree rules metaphor according to an embodiment of the invention.

Decision trees are often interchangeable with decision tables for presenting decision information corresponding to business tasks. FIG. 4a is an example of a decision tree 400 corresponding to the shipping price task described with respect to the decision table of FIG. 2a. In FIG. 4a, nodes 402, 404, and 406 represent decision nodes. Decision node 402 is directed to the analysis of the destination of a shipped package, with branch 403 corresponding to domestic destinations and branch 405 corresponding to foreign destinations. Each of these branches feed to additional decision nodes (404 and 406) directed to the analysis of the weight of a shipped package. Based upon the weight of a shipped package, the appropriate path from decision nodes 404 or 406 is followed to a terminal node (410–415) that corresponds to a unique combination of package weight and destination. Each terminal node 410–415 identifies the shipping price for that unique combination of package weight and destination.

According to an embodiment, a decision tree is implemented as an object-oriented structure in which each node is associated with a particular object type. Examples of object/node types utilizable with the invention include the decision node type, chance node type, and terminal node type. Each object type has specific attributes corresponding to characteristics definable for that type. For example, a node of the object type "decision node" can be defined with one or more "path" attributes that describe the successor paths leading out from that decision node based upon the occurrence/identification of certain conditions or events. A node of the object type "chance node" can be defined with one or more "path" attributes that describe the successor paths leading out from that chance node based upon the occurrence/identification of certain probability factors. A node of the object type "terminal node" can be defined with an "action" or "decision" attribute that describes an action to apply or a decision to make if the terminal node is selected.

Like decision tables, the contents of a decision tree can be converted into a format or syntax that is understandable by a rules engine. In an embodiment, the decision tree converts into a set of statements in a structured rules-language syntax or into application specific binary code statements. According to an embodiment, each terminal node is converted into an "if" statement performing the action, decision, or conclusion defined for that node. A separate statement can be generated in a rules-language syntax for each terminal node in a decision tree, based upon the specific nodes and paths that exist between the highest-level node and a terminal node. Each decision or chance node is converted into a conditional clause or statement based upon the attributes defined for that node for the selection of successor paths. Alternatively, a single statement can be generated for an entire decision tree, even if the decision tree has multiple terminal nodes, with varying levels of nested statements existing based upon the number of terminal nodes and intermediate decision/chance nodes between the highest-level node and the terminal node(s). Since decision tree 400 of FIG. 4a is functionally equivalent to decision table 200 of FIG. 2a, it should also convert into the same or equivalent set of rules-syntax statements as defined for decision table 200.

Another type of tree is the classification tree, which can be formed from data analysis or data mining operations and seen as the result of an induction process performed on data sets. Classification trees are usable as classifiers or prediction models. According to an embodiment, classification tree are built as follows:

Data is analyzed to identify the set of attributes that contain the most information on which the set can be split in subsets. This analysis can be based upon statistical and information theory tools;

The data is split into subsets according to the values of these attributes; and

The process is repeated for each subset until there exists no further set(s) of attribute upon which to split the final sets.

Figure 4B:
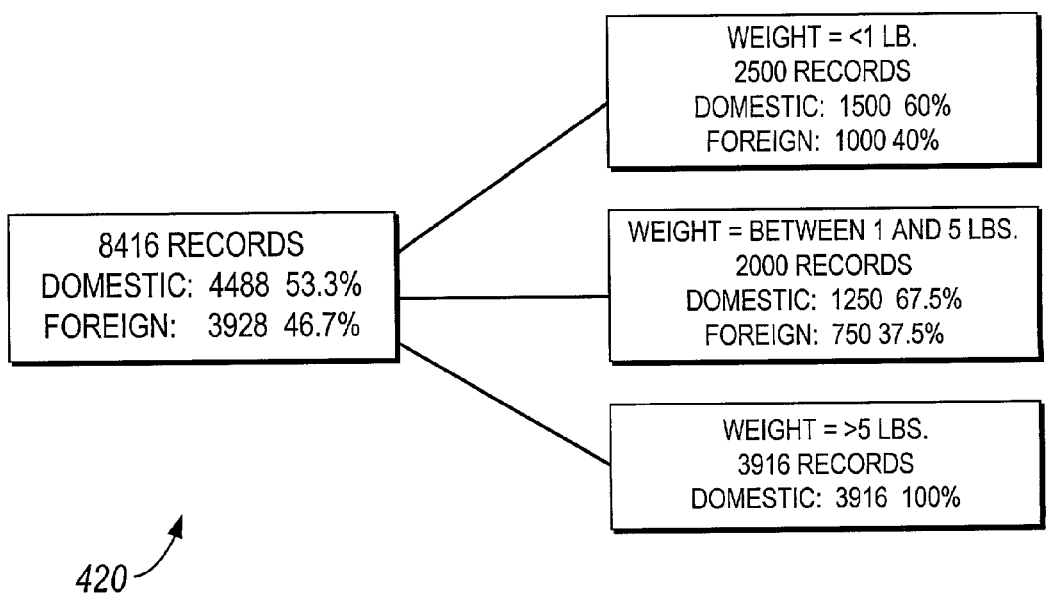
FIG. 4b illustrates a classification tree rules metaphor according to an embodiment of the invention.

The final nodes express the actual classification, and the intermediate nodes are the nodes that represent the criteria on which the classification is built. Classification trees can be advantageously used in many ways; for example, classification trees are used to extract probabilistic decision trees. FIG. 4b depicts an example classification tree 420 based upon the shipping records for a fictional shipping company.

Computation trees are a type of decision tree in which the terminal nodes contain values that are used to provide a computational evaluation of the tree when applied to a set of objects. For example, computation trees can be advantageously used for computation trees scoring applications and financial computations.

Questionnaire Metaphor

Another rules metaphor usable with the invention is the questionnaire metaphor. A questionnaire is essentially a conversational dialog between a rules engine and an application or user. A smart questionnaire uses prior answers to determine the next question(s) to ask. Unlike paper questionnaires that must expose all possible questions on the printed form, an electronic questionnaire need only ask the relevant questions given the assembled responses to date.

One way smart questionnaires are implemented in the present invention is through the "prompt" action of a rule. These prompt actions cause a callback that handles the prompt. A callback question handler interrogates the prompt string to identify what question(s) are being asked, forms up a GUI template to ask the question(s), presents the question(s), gets the response(s), updates objects with the responses, and then returns to the rules engine. The rules engine takes the new values, decides what rule(s) to schedule onto the agenda and generates the appropriate rule(s) that may lead to additional question(s).

The intent of a questionnaire problem domain editor is to visualize this conversational dialog. In particular, a questionnaire metaphor editor should:

Define the initial set of questions that are first presented to the application. These questions could be in the form of actual text, HTML fragments, or indexes into a question text table (e.g., if the questions may need to be delivered in many languages). The responses to the question are defined in terms of response values as well as the data type of the response value(s). Example response types include text, enumerations, numbers, and yes/no answers.

For each question response, define the new question to ask. The new question could be simply driven off the response of the prior question or be a more complex rules-driven condition that examines the values of multiple question answers in addition to, or instead of, accessing other databases or application services Define a target object property to store the response.

Consider the following example of a rules-driven questionnaire for guiding a purchaser through a product selection process. The problem domain is buying a computer through a Web site. The business process analyst decides that the following question is presented initially:

Q1—Do you plan to use the computer for home or business?

Q2—What is your target price?

If Q1 is answered "Home", then these additional questions appear:

Q1.1 Do you have children at home that will use this computer?

Q1.2 Do you need to interconnect this computer with others in your house?

If Q1 is answered "Business", then these questions appear:

Q2.1 What is your corporate LAN adapter standard (Fast Ethernet, 10 Mbps Ethernet, Token Ring)?

Q2.2 What is your corporate operating system standard (Win95, Win NT4.0, Win 98)?

In this simple example, the answers to one question define the next questions to ask. In a more complex example, rules could be defined, based on the response to a question, to decide what the next question should be. For example, if the just-posed question was:

Q8—Do you plan on connecting to the Internet from your home computer?

and the answer was Yes, then the next question might use rules to limit the choice of modems available to the prospective purchaser based on the purchaser'' budget and purchaser'' location. Rules could add DSL modems to the question "How fast do you want to connect to the Internet?" if the purchaser has a budget target over 3,000 dollars and the purchaser lived in the Pacific Bell region of the country. Any of the rules metaphors described herein could be employed to generate these specific rules used in a questionnaire.

According to an embodiment of the invention, a questionnaire editor provides a mechanism to define a smart dialog between the system and a user. The actual presentation style of the questions and their responses is determined by the application to which the rules engine is directed. In this manner, an intelligent dialog can be carried out over the Web, over a voice response unit (VRU), at a kiosk or ATM, or within a traditional GUI-based client-server application.

Configuration Verification Metaphor

Another commonly-seen business rules problem is the testing of choices against each other for validity. For example, consider a rule stating that if a customer orders a car with a trailer hitch, the order must also include an engine of at least 3 liters in size. A slightly more complex case occurs when a customer orders a "Touring" package that contains a sun roof, fold-down picnic tray tables, automatic transmission, air conditioning, and food hamper; if the purchaser orders the "Touring Package", the rule could state that the customer should not also individually specify a manual transmission.

According to an embodiment, a configuration verification problem domain editor should be able to perform the following:

Define individual options;

Define aggregations of options; define aggregations of aggregations;

Define conflicts—option X does not work with option Y; aggregate A does not work with option V;

Define recommendations—if option F chosen, recommend options G, H and aggregate J;
Define mandatory options—if option K then option L must be chosen.

Figure 5A:
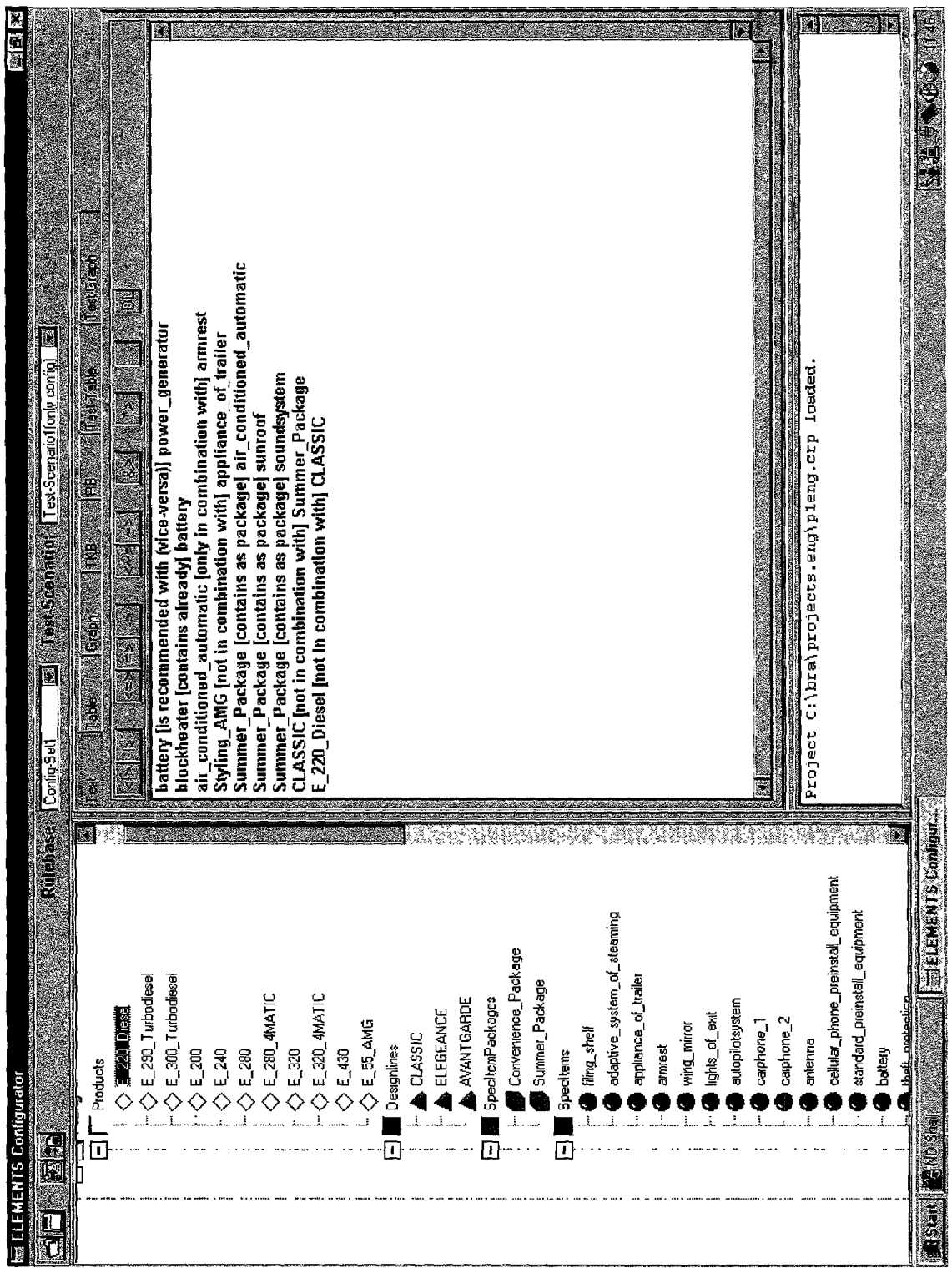
FIGS. 5a–5c depict configuration verification rules metaphors according to an embodiment of the invention.
Figure 5B:
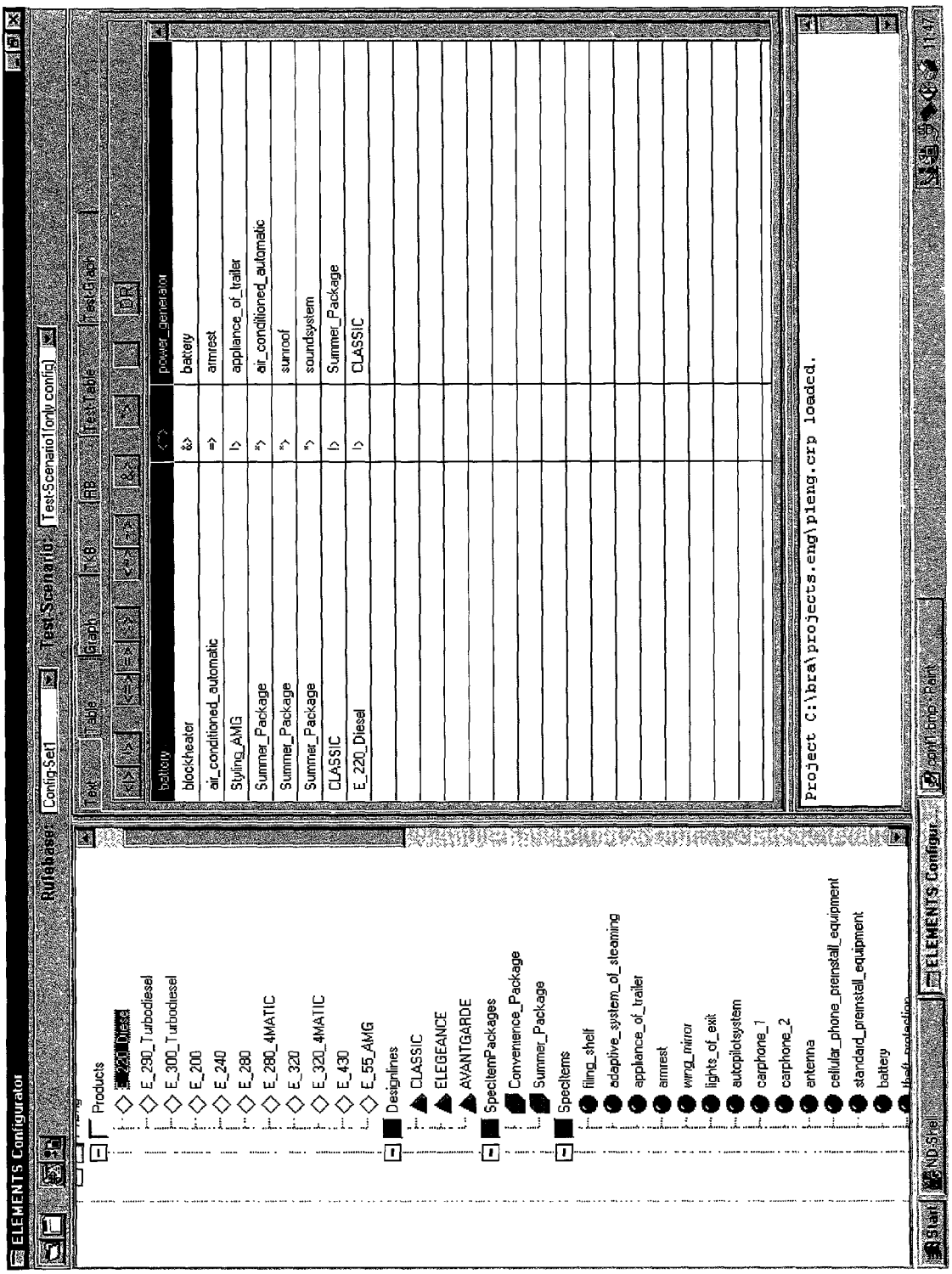

The diagrams in FIGS. 5a and 5b represent two interfaces that can be utilized to implement and specify configuration validation rules. FIG. 5a represents a text-based approach and FIG. 5b represents a tabular approach. The following represent examples of configuration validation rule types with examples of syntactic symbol translations for each set forth in parentheses:

| | |
|---|---|
| A [is recommended with (vise-versa)] | B (A <~> B) |
| A [contains already] B | (A &> B) |
| A [only in combination with] B | (A => B) |
| A [not in combination with] B | (A !> B) |
| A [contains as package] B | (A *> B) |
| A [not in combination with] B | (A !> B) |

Figure 5C:
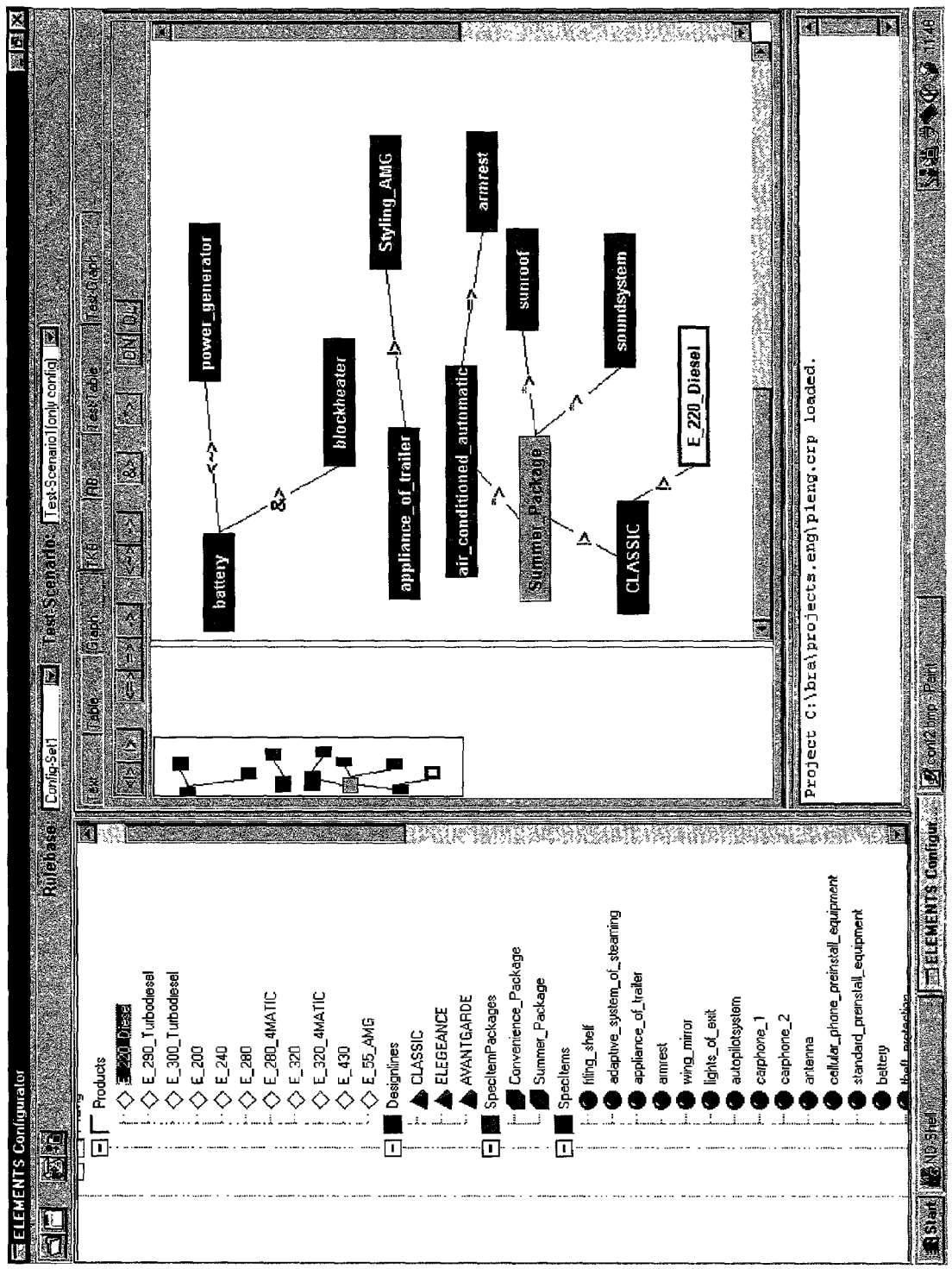

The example screen shot of FIG. 5c depicts another way to visualize the above configuration verification rules in diagram form. In FIG. 5c, a configuration validation rule is represented by one or more nodes connected to one or more other nodes. Each node corresponds to an object of a particular object type. The lines connecting each node is defined by one of the above symbols representing a configuration mode.

The left section of the user interfaces shown in FIGS. 5a–c also list each of the selectable objects are displayed in a hierarchical fashion. According to an embodiment, each selectable object type is displayed in a different color, with each option is displayed in a first color, option packages displayed in a second color, and larger marketing packages displayed in a third color. This kind of hierarchy allows one to define aggregations of options. The rules can be used to define valid/invalid configurations between any aggregate level and any other aggregate level.

Figure 5D:
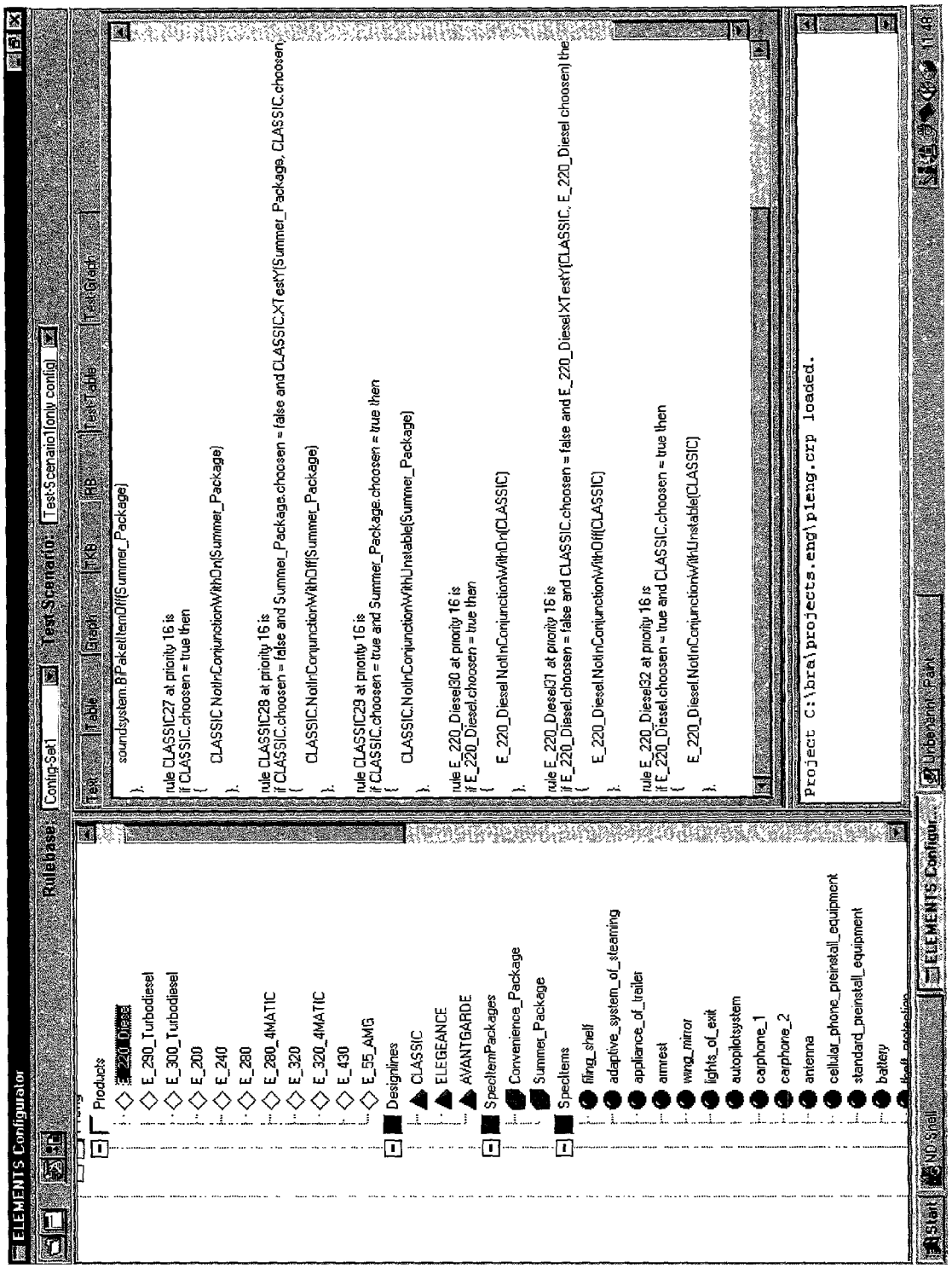
FIG. 5d illustrates a translation of a configuration verification rules metaphor in to a structured rule-language syntax.

Similar to the other rules metaphors described above, the configuration validation rules metaphor can be used to generate rules in a rules-language syntax understandable by a rules engine. In the screen shot of FIG. 5d, rules generated from the configurations of FIGS. 5a–c are shown. Note that a user does not normally need to see the interface of FIG. 5d since all rule definitions could be done through the user interfaces of FIGS. 5a–c.

State Transition Metaphor

The state transition rules metaphor is particularly useful to address applications and business problems where rules are applied based upon the definition of an object's states and how events and conditions cause the state to change. An example is the state of an "order" in a business process. Orders may proceed from an "entered" state, to a "credit-checked" state, to an "payment" state, to a "paid" state, and to a "delivery" state, with various branches along the way. A state transition diagram or its equivalent state transition matrix can represent the events and rules that move an order along from state to state.

Figures 6A, 6B:
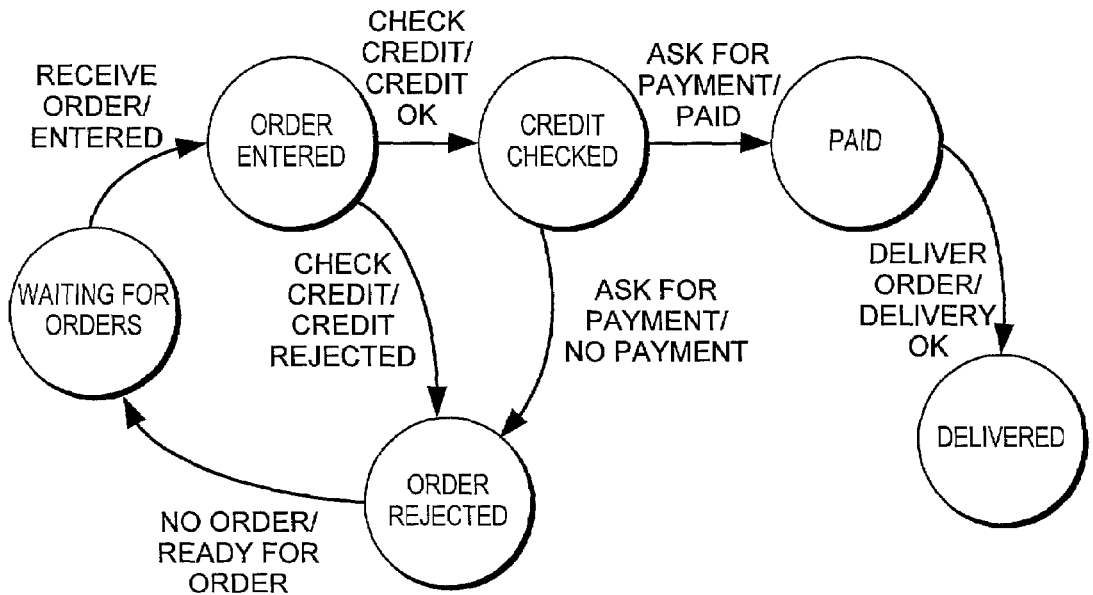
FIGS. 6a–c illustrate state diagram rules metaphors according to an embodiment of the invention.

In FIG. 6a, a state transition diagram is shown illustrating the states of an order processing flow. The circles are the states—"waiting for order", "order entered", "credit checked", "paid", "delivered" and "order rejected". The lines (arcs) are divided into descriptions having two portions. Before the slash is the event that causes the order process to change state. After the slash is the action(s) performed when the event occurs. In other words, the text before the slash is a description of an event or rules that, when true, pushes the object out of its current state. For example, if the current state is "waiting for orders", and if the event is an "order is received", then the new state is "order entered" and the next action is to "check credit". Similar to other rules metaphors disclosed herein, the state transition diagrams can be implemented by defining objects for each node in the diagram. Different objects may have different attributes consistent with the characteristics and functionality of that node. For example, the successor paths or arcs leading from each node in a state transition diagram could be represented as attributes of its corresponding node. The diagram could therefore be transformed into a syntax directly usable by a rules engine by traversing the nodes of the state diagram, and converting each node and arc into a series of nested "if" or "case" type statements (or their equivalents).

State transition diagrams can also be represented as a table as shown in FIG. 6b. Here, the states are on the left and the event (stimulus) is across the top. The new state is shown on the right and the action(s) that occur for the stimulus/current state combination are within the body of the grid. The matrix could be a superior representation when there are a large number of states and many possible transitions that would otherwise overwhelm a diagram.

Figure 6C:
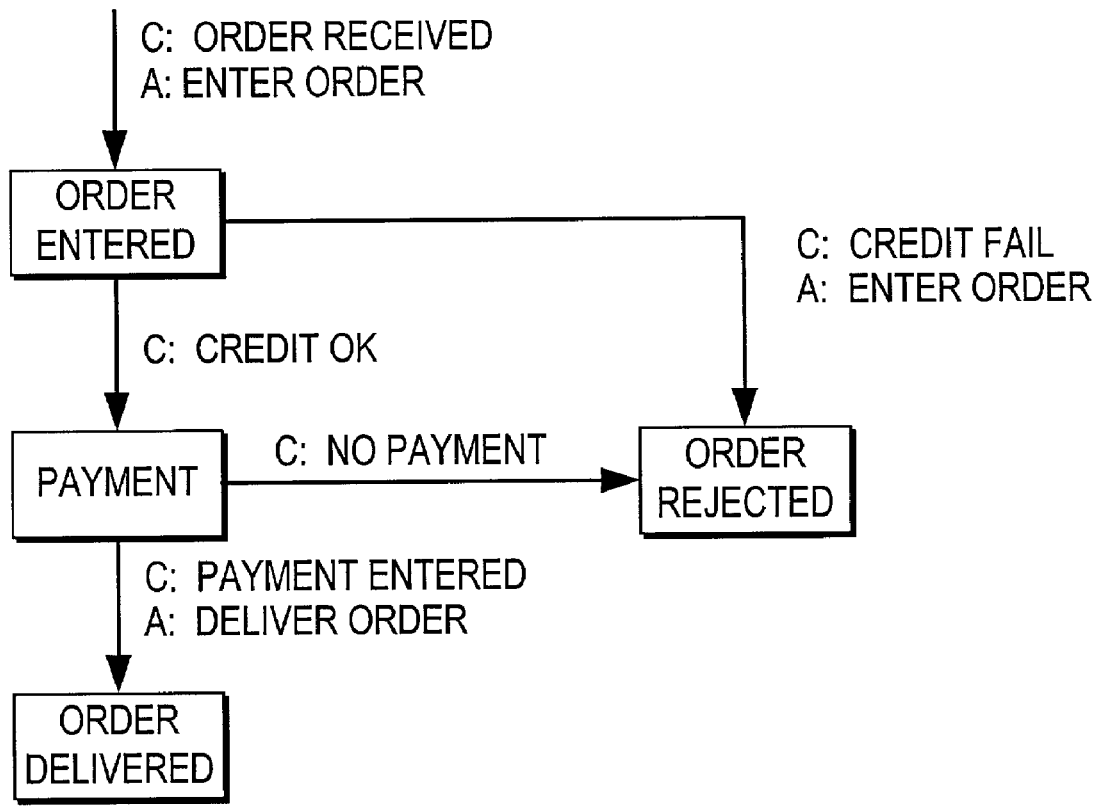

FIG. 6c is an example of a different type of representation for a state transition diagram. "C:" is the condition (stimulus) that pushes the object or process out of its current state and "A:" is a list of actions that occur when the object or process transitions to the new state.

The presently disclosed diagramming technique could apply to numerous applications and business problems, such as the states of an order, the states of an insurance claim, the states of a loan application, etc. For a rules engine, the conditions that move an object from one state to another could be either simple or complex. A rules engine rules metaphor would allow for an entire ruleset to be applied to determine a condition result that can be used to transit to a new state.

SYSTEM ARCHITECTURE OVERVIEW

Figure 7:
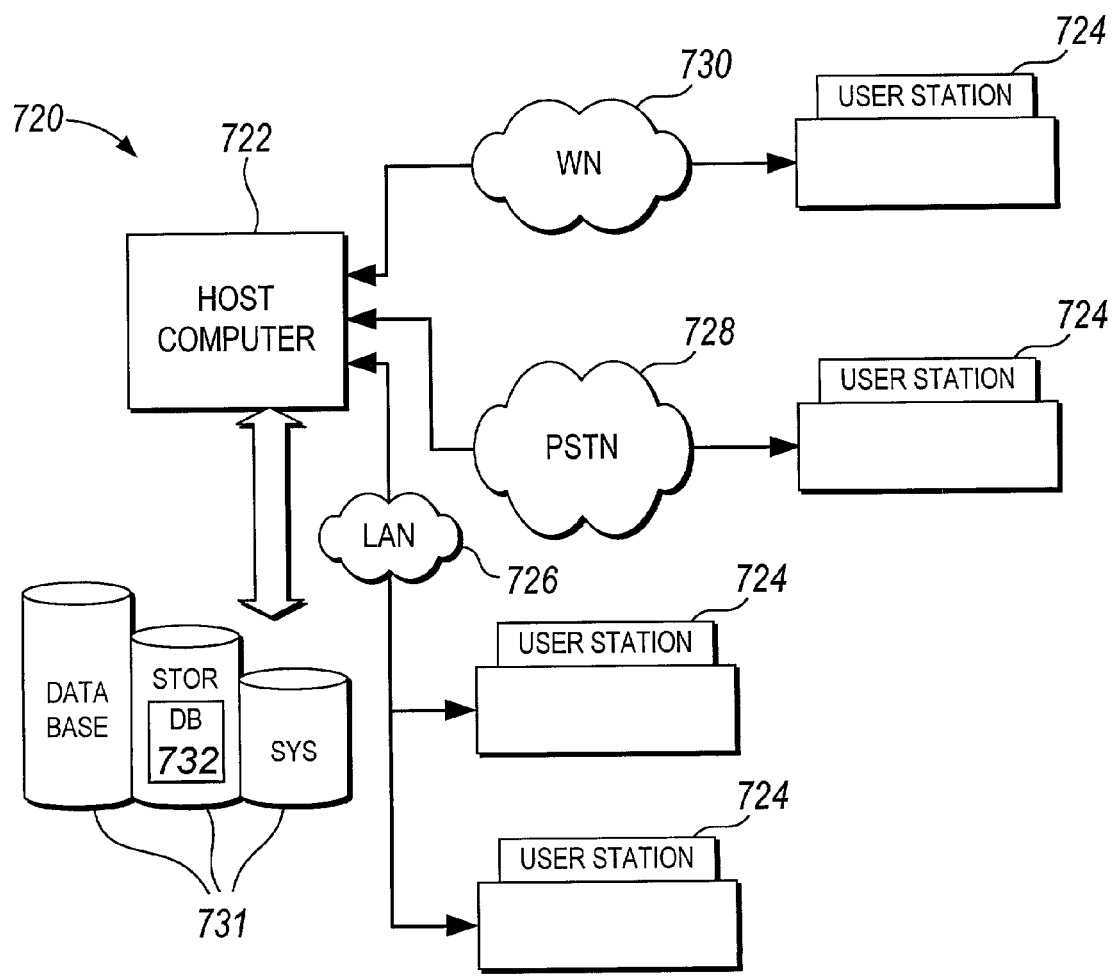
FIGS. 7–8 depict computer architecture configuration(s) upon which the present invention may be implemented.

Referring to FIG. 7, in an embodiment, a computer system 720 includes a host computer 722 connected to a plurality of individual user stations 724. The user stations 724 each comprise suitable data interface terminals, for example, but not limited to, personal computers, portable laptop computers, or personal data assistants ("PDAs"), which can store and independently run one or more applications. For purposes of illustration, some of the user stations 724 are connected to the host computer 722 via a local area network ("LAN") 726. Other user stations 724 are remotely connected to the host computer 722 via a public telephone switched network ("PSTN") 728 and/or a wireless network 730.

In an embodiment, the host computer 722 operates in conjunction with a data storage system 731, wherein the data storage system 731 contains a database 732 that is readily accessible by the host computer 722. Note that a multiple tier architecture can be employed to connect user stations 724 to a database 732, utilizing for example, a middle application tier (not shown). In alternative embodiments, the database 732 may be resident on the host computer, stored, e.g., in the host computer's ROM, PROM, EPROM, or any other memory chip, and/or its hard disk.

Figure 8:
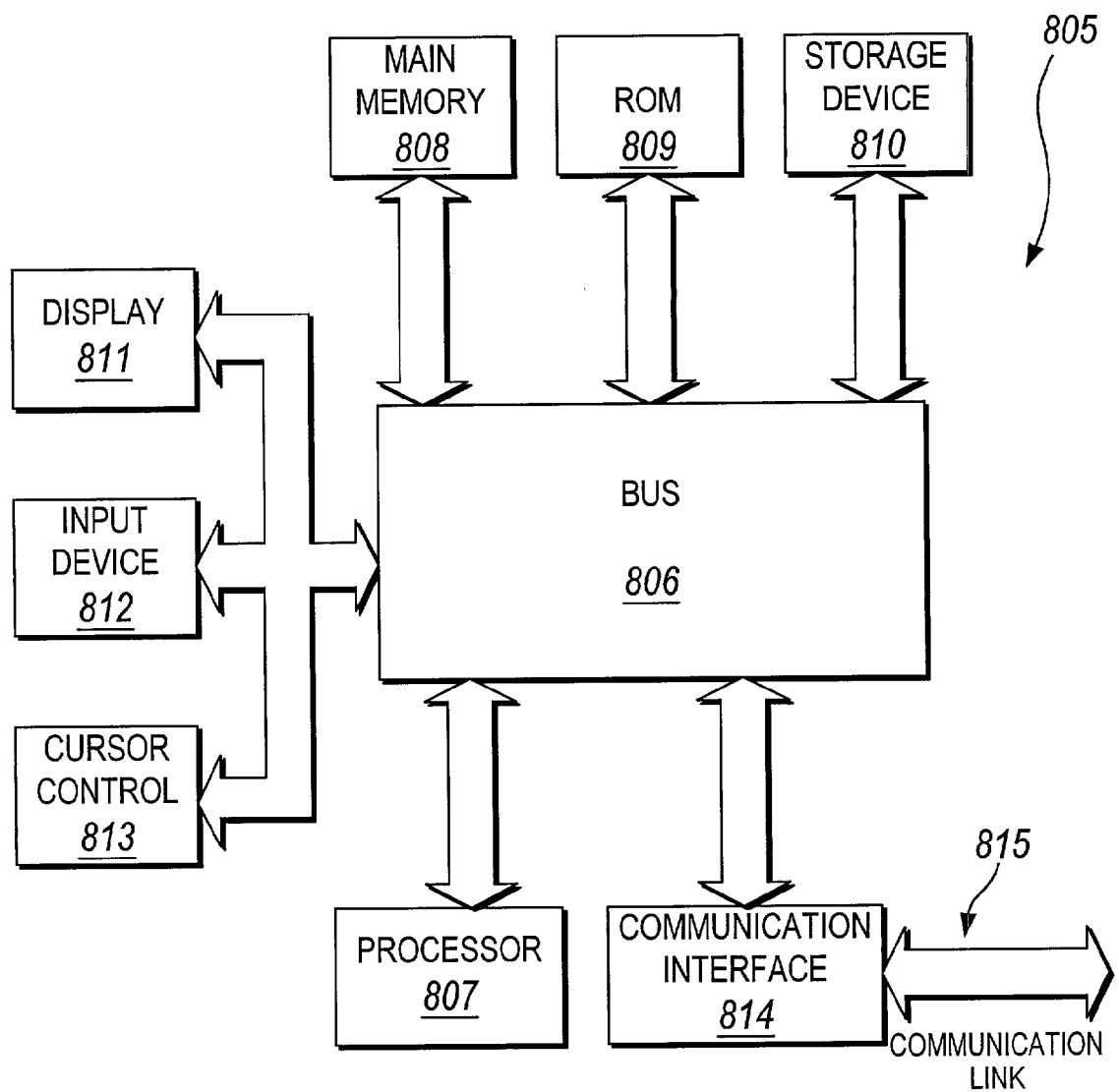

Referring to FIG. 8, in an embodiment, each user station 724 and the host computer 722, each referred to generally as a processing unit, embodies a general architecture 805. A processing unit includes a bus 806 or other communication mechanism for communicating instructions, messages and data, collectively, information, and one or more processors 807 coupled with the bus 806 for processing information. A processing unit also includes a main memory 808, such as a random access memory (RAM) or other dynamic storage device, coupled to the bus 806 for storing dynamic data and instructions to be executed by the processor(s) 807. The main memory 808 also may be used for storing temporary data, i.e., variables, or other intermediate information during execution of instructions by the processor(s) 807. A processing unit may further include a read only memory (ROM) 809 or other static storage device coupled to the bus 806 for storing static data and instructions for the processor(s) 807. A storage device 810, such as a magnetic disk or optical disk, may also be provided and coupled to the bus 806 for storing data and instructions for the processor(s) 807. A processing unit may be coupled to a display device 811 for displaying information to a user. An input device 812 is coupled to the bus 806 for communicating information and command selections to the processor(s) 807. User input device 812 may include a cursor control 813 for communicating direction information and command selections to the processor(s) 807 and for controlling cursor movement on the display 811.

According to one embodiment of the invention, the individual processing units perform specific operations by their respective processor(s) 807 executing one or more sequences of one or more instructions contained in the main memory 808. Such instructions may be read into the main memory 808 from another computer-usable medium, such as the ROM 809 or the storage device 810. Execution of the sequences of instructions contained in the main memory 808 causes the processor(s) 807 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 807. Such a medium may take many forms, including, but not limited to, non-volatile, volatile and transmission media. Non-volatile media, i.e., media that can retain information in the absence of power, includes the ROM 809. Volatile media, i.e., media that can not retain information in the absence of power, includes the main memory 808. Transmission media includes coaxial cables, copper wire and fiber optics, including the wires that comprise the bus 806. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications. Various forms of computer-usable media may be involved in providing one or more sequences of one or more instructions to the processor(s) 807 for execution.

Each processing unit may also include a communication interface 814 coupled to the bus 806. The communication interface 814 provides two-way communication between the respective user stations 824 and the host computer 822. The communication interface 814 of a respective processing unit transmits and receives electrical, electromagnetic or optical signals that include data streams representing various types of information, including instructions, messages and data. A processing unit may transmit and receive messages, data, and instructions, including program, i.e., application, code, through its respective communication link 815 and communication interface 814. Received program code may be executed by the respective processor(s) 807 as it is received, and/or stored in the storage device 810, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein are merely illustrative, and the invention can be performed using different or additional process actions, or a different combination or ordering of process actions. The specification and drawings are, accordingly, to be regarded in an illustrative rather than restrictive sense.

What is claimed is:

1. A computer-based method of implementing rules for decision making in a computerized business process activity in a computerized rules-based system, comprising:

providing a first interface in the computerized rules-based system for allowing a user to access rule information;

providing a second interface in the computerized rules-based system for allowing a user to access rule information, the second interface different from the first interface;

defining a ruleflow associated with said business process activity, said ruleflow having at least one task, wherein a ruleflow represents a series of rule elements;

based on the way any of associated requirements or specification information are expressed, selecting either the first interface or the second interface to implement a first ruleset corresponding to the at least one task; and implementing the first ruleset using a selected interface, the first ruleset comprising at least one rule to obtain an associated decision of the business process activity.

2. The computer-based method of claim 1 in which either the first or second interfaces is a decision table metaphor.

3. The computer-based method of claim 2 in which the act of implementing the ruleset using the decision table metaphor comprises:

analyzing parameters of the task to determine information elements needed to make a decision to implement functionality of the at least one task; and defining a grid of one or more cells corresponding to the information elements.

4. The computer-based method of claim 3 in which the grid of one or more cells comprises:

a condition cell corresponding to a condition; and an action cell corresponding to the condition cell, the action cell comprising an action that occurs upon satisfying a condition defined for the condition cell.

5. The computer-based method of claim 3 in which each cell in the grid of one or more cells has a defined object type having attributes relating to the function of the cell.

6. The computer-based method of claim 5 in which a plurality of cell object types are employed in the grid of one or more cells.

7. The computer-based method of claim 3 in which a cell in the grid of one or more cells comprises a formula.

8. The computer-based method of claim 3 in which a cell in the grid of one or more cells comprises a call to an external function.

9. The computer-based method of claim 3 in which a cell in the grid of one or more cells references an external ruleset.

10. The computer-based method of claim 3 in which a cell in the grid of one or more cells references another decision table.

11. The computer-based method of claim 3 in which the grid of one or more cells comprises a multi-column arrangement.

12. The computer-based method of claim 11 in which the multi-column arrangement comprises a plurality of dimensions for cell grids in the grid of one or more cells.

13. The computer-based method of claim 2 in which the decision table metaphor is an AND decision table.

14. The computer-based method of claim 13 in which the AND decision table is organized as a traditional AND decision table.

15. The computer-based method of claim 13 in which the AND decision table has an inverted action section organized with a condition section.

16. The computer-based method of claim 2 in which the decision table metaphor is an AND/OR decision table.

17. The computer-based method of claim 2 in which the decision table metaphor is an AND decision table.

18. The computer-based method of claim 1 in which either the first or second interfaces is a tree metaphor.

19. The computer-based method of claim 18 in which the act of implementing the first ruleset using the tree metaphor comprises:
  analyzing parameters of the at least one task to determine parameters to implement functionality of the at least one task; and
  defining a tree of one or more nodes corresponding to the parameters.

20. The computer-based method of claim 19 in which the one or more nodes comprise a node having one or more successor paths based upon evaluation of a condition.

21. The computer-based method of claim 19 in which the one or more nodes comprise a node having one or more successor paths based upon probability factors.

22. The computer-based method of claim 19 in which the one or more nodes comprise a node containing the conclusion of a decision making process.

23. The computer-based method of claim 22 in which the node containing the conclusion of a decision making process comprises an action to apply.

24. The computer-based method of claim 18 in which the tree metaphor is selected from the group consisting of decision tree metaphor, classification tree metaphor, and computation tree metaphor.

25. The computer-based method of claim 1 in which either the first or second rules metaphor interfaces is a scorecard metaphor.

26. The computer-based method of claim 25 in which the act of implementing the first ruleset using the scorecard metaphor comprises:
  analyzing parameters of the task to determine object attributes to implement functionality of the at least one task; and
  defining a scorecard having point values assigned to possible object attribute values.

27. The computer-based method of claim 1 in which either the first or second rules metaphor interfaces is a questionnaire metaphor.

28. The computer-based method of claim 27 in which the act of implementing the first ruleset using the questionnaire metaphor comprises:
  analyzing parameters of the task to define a set of questions to be presented; and
  defining follow-up questions for responses to answers to the set of questions.

29. The computer-based method of claim 27 in which the first ruleset is generated based upon the defined set of question and follow-up questions.

30. The computer-based method of claim 1 in which either the first or second rules metaphor interfaces is a configuration verification metaphor.

31. The computer-based method of claim 27 in which the act of implementing the first ruleset using the configuration verification metaphor comprises:
  analyzing parameters of the task to identify a set of choice parameters having interrelationships; and
  defining relationships between members in the set of choice parameters.

32. The computer-based method of claim 31 further comprising:
  defining individual options for the members in the set of choice parameters.

33. The computer-based method of claim 31 further comprising:
  defining an aggregation of options for the members in the set of choice parameters.

34. The computer-based method of claim 31 further comprising:
  defining conflicts for the members in the set of choice parameters.

35. The computer-based method of claim 31 further comprising:
  defining mandatory relationships for the members in the set of choice parameters.

36. The computer-based method of claim 31 further comprising:
  defining recommendations for the members in the set of choice parameters.

37. The computer-based method of claim 1 in which either the first or second interfaces is a state transition diagram metaphor.

38. The computer-based method of claim 1 in which the ruleflow comprises a second task, the method further comprising:
  selecting the first interface to implement a second ruleset corresponding to the second task if the second interface was selected to implement the first ruleset; and
  selecting the second interface to implement a second ruleset corresponding to the second task if the first interface was selected to implement the first ruleset.

39. The computer-based method of claim 38 in which the second ruleset utilizes the results of the first ruleset.

40. A computer program product that includes a medium usable by a processor, the medium having stored thereon a sequence of instructions which, when executed by said processor, causes said processor to execute a process for implementing rules for decision making in a computerized business process activity in a computerized rules-based system, said process comprising:
  providing a first interface in the computerized rules-based system for allowing a user to access rule information;
  providing a second interface in the computerized rules-based system for allowing a user to access rule information, the second interface different from the first interface;

defining a ruleflow associated with said business process activity, said ruleflow having at least one task, wherein a ruleflow represents a series of rule elements;

based on the way any of associated requirements or specification information are expressed, selecting either the first interface or the second interface to implement a first ruleset corresponding to the at least one task; and implementing the first ruleset using a selected interface, the first ruleset comprising at least one rule to obtain an associated decision of the business process activity.

41. The computer program product of claim 40 in which either the first or second interfaces is a decision table metaphor.

42. The computer program product of claim 41 in which the act of implementing the ruleset using the decision table metaphor comprises:

analyzing parameters of the task to determine information elements needed to make a decision to implement functionality of the at least one task; and defining a grid of one or more cells corresponding to the information elements.

43. The computer program product of claim 42 in which the grid of one or more cells comprises:

a condition cell corresponding to the condition; and an action cell corresponding to the condition cell, the action cell comprising an action that occurs upon satisfying a condition defined for the condition cell.

44. The computer program product of claim 42 in which each cell in the grid of one or more cells has a defined object type having attributes relating to the function of the cell.

45. The computer program product of claim 44 in which a plurality of cell object types are employed in the grid of one or more cells.

46. The computer program product of claim 42 in which a cell in the grid of one or more cells comprises a formula.

47. The computer program product of claim 42 in which a cell in the grid of one or more cells comprises a call to an external function.

48. The computer program product of claim 42 in which a cell in the grid of one or more cells references an external ruleset.

49. The computer program product of claim 42 in which a cell in the grid of one or more cells references another decision table.

50. The computer program product of claim 42 in which the grid of one or more cells comprises a multi-column arrangement.

51. The computer program product of claim 50 in which the multi-column arrangement comprises a plurality of dimensions for cell grids in the grid of one or more cells.

52. The computer program product of claim 41 in which the decision table metaphor is an AND decision table.

53. The computer program product of claim 52 in which the AND decision table is organized as a traditional AND decision table.

54. The computer program product of claim 52 in which the AND decision table has an inverted action section organized with a condition section.

55. The computer program product of claim 41 in which the decision table metaphor is an AND/OR decision table.

56. The computer program product of claim 41 in which the decision table metaphor is an AND decision table.

57. The computer program product of claim 40 in which either the first or second interfaces is a tree metaphor.

58. The computer program product of claim 57 in which the act of implementing the first ruleset using the tree metaphor comprises:

analyzing parameters of the at least one task to determine parameters to implement functionality of the at least one task; and defining a tree of one or more nodes corresponding to the parameters.

59. The computer product program of claim 58 in which the one or more nodes comprise a node having one or more successor paths based upon evaluation of a condition.

60. The computer program product of claim 58 in which the one or more nodes comprise a node having one or more successor paths based upon probability factors.

61. The computer program product of claim 58 in which the one or more nodes comprise a node containing the conclusion of a decision making process.

62. The computer program product of claim 61 in which the node containing the conclusion of a decision making process comprises an action to apply.

63. The computer program product of claim 57 in which the tree metaphor is selected from the group consisting of decision tree metaphor, classification tree metaphor, and computation tree metaphor.

64. The computer program product of claim 40 in which either the first or second interfaces is a scorecard metaphor.

65. The computer program product of claim 64 in which the act of implementing the first ruleset using the scorecard metaphor comprises:

analyzing parameters of the task to determine object attributes to implement functionality of the at least one task; and defining a scorecard having point values assigned to possible object attribute values.

66. The computer program product of claim 40 in which either the first or second interfaces is a questionnaire metaphor.

67. The computer program product of claim 66 in which the act of implementing the first ruleset using the questionnaire metaphor comprises:

analyzing parameters of the task to define a set of questions to be presented; and defining follow-up questions for responses to answers to the set of questions.

68. The computer program product of claim 66 in which the first ruleset is generated based upon the defined set of questions and follow-up questions.

69. The computer program product of claim 40 in which either the first or second interfaces is a configuration verification metaphor.

70. The computer program product of claim 69 in which the act of implementing the first ruleset using the configuration verification metaphor comprises:

analyzing parameters of the task to identify a set of choice parameters having interrelationships; and defining relationships between members in the set of choice parameters.

71. The computer program product of claim 70 further comprising:

defining individual options for the members in the set of choice parameters.

72. The computer program of claim 70 further comprising:

defining an aggregation of options for the members in the set of choice parameters.

73. The computer program product of claim 70 further comprising:

defining conflicts for the members in the set of choice parameters.

74. The computer program product of claim 70 further comprising:
defining mandatory relationships for the members in the set of choice parameters.

75. The computer program product of claim 70 further comprising:
defining recommendations for the members in the set of choice parameters.

76. The computer program product of claim 40 in which either the first or second interfaces is a state transition diagram metaphor.

77. The computer program product of claim 40 in which the ruleflow comprises a second task, the method further comprising:
selecting the first interface to implement a second ruleset corresponding to the second task if the second interface was selected to implement the first ruleset; and
selecting the second interface to implement a second ruleset corresponding to the second task if the first interface was selected to implement the first ruleset.

78. The computer program product of claim 77 in which the second ruleset utilizes the results of the first ruleset.

* * * * *

UNITED STATES PATENT AND TRADEMARK OFFICE
CERTIFICATE OF CORRECTION

PATENT NO. : 6,968,328 B1　　　　　　　　　　　　　　　　　　　　　Page 1 of 2
DATED : November 22, 2005
INVENTOR(S) : Kintzer et al.

It is certified that error appears in the above-identified patent and that said Letters Patent is hereby corrected as shown below:

Drawings,
Sheet 6, Fig. 2f, should be labeled -- 283 -- as shown on the attached page.

Column 2,
Line 17, "rule" should be -- rules --.
Line 19, "methaphors" should be -- metaphor --.

Column 3,
Line 2, "in to" should be -- into --.
Line 27, "rule" should be -- rules --.

Column 4,
Line 16, "$15" should be -- $20 --.
Line 66, "to use" should be deleted.

Column 7,
Line 50, "representing" should be -- represent --.

Column 16,
Line 28, "rule information" should be -- rules information --.
Line 35, "rule element" should be -- ruleflow element --.

Signed and Sealed this

Ninth Day of May, 2006

JON W. DUDAS
*Director of the United States Patent and Trademark Office*

| CONDITIONS | | | | | |
|---|---|---|---|---|---|
| SALARY | HIGH | HIGH | LOW | HIGH | LOW |
| WORK QUANTITY | HIGH | LOW | LOW | LOW | HIGH |
| WORK QUALITY | HIGH | HIGH | LOW | LOW | LOW |
| PUNCTUALITY | LATE | ON-TIME | EARLY | LATE | |
| ACTIONS | | | | | |
| EMPLOYEE 1 | KEEP | KEEP | FIRE | FIRE | KEEP |
| EMPLOYEE 2 | KEEP | FIRE | KEEP | FIRE | KEEP |
| EMPLOYEE 3 | KEEP | KEEP | KEEP | FIRE | FIRE |

FIG. 2f

UNITED STATES PATENT AND TRADEMARK OFFICE
CERTIFICATE OF CORRECTION

PATENT NO. : 6,968,328 B1  Page 1 of 1
DATED : November 22, 2005
INVENTOR(S) : Kintzer et al.

It is certified that error appears in the above-identified patent and that said Letters Patent is hereby corrected as shown below:

Column 16,
Line 30, "rule information" should be -- rules information --.

Column 18,
Line 65, "rule information" should be -- rules information --.

Signed and Sealed this

Thirteenth Day of June, 2006

JON W. DUDAS
*Director of the United States Patent and Trademark Office*